US008140202B2

(12) United States Patent
Dibble et al.

(10) Patent No.: US 8,140,202 B2
(45) Date of Patent: Mar. 20, 2012

(54) METHOD OF CONTROLLING A RAIL TRANSPORT SYSTEM FOR CONVEYING BULK MATERIALS

(75) Inventors: Merton F. Dibble, Morganton, GA (US); Joe Capers, Lakeland, FL (US)

(73) Assignee: Rail-Veyor Systems, Inc., Morganton, GA (US)

( * ) Notice: Subject to any disclaimer, the term of this patent is extended or adjusted under 35 U.S.C. 154(b) by 1125 days.

(21) Appl. No.: 11/959,950

(22) Filed: Dec. 19, 2007

(65) Prior Publication Data

US 2008/0154451 A1 Jun. 26, 2008

Related U.S. Application Data

(60) Provisional application No. 60/871,232, filed on Dec. 21, 2006, provisional application No. 60/909,971, filed on Apr. 4, 2007.

(51) Int. Cl.
*G05D 1/00* (2006.01)

(52) U.S. Cl. .. 701/20; 104/53; 246/182 R; 246/182 BH; 472/43

(58) Field of Classification Search .................... 701/20; 104/53, 63; 446/429; 472/43; 246/182 R, 246/182 BH, 182 C
See application file for complete search history.

(56) References Cited

U.S. PATENT DOCUMENTS 3,039,402 A * 6/1962 Richardson .................. 104/168
3,332,535 A 7/1967 Hubert
3,612,303 A 10/1971 Ikeda
3,727,776 A 4/1973 Meeusen
3,752,334 A * 8/1973 Robinson et al. ............. 414/357
3,797,682 A 3/1974 DeBeer
4,082,181 A 4/1978 Berthold et al.
4,370,931 A * 2/1983 de Broqueville ............... 104/20
4,440,537 A 4/1984 Blattermann et al.
4,767,253 A 8/1988 Luck
4,795,264 A 1/1989 Riker
4,915,452 A 4/1990 Dibble
4,925,356 A 5/1990 Snead et al.
4,957,405 A 9/1990 Roberts et al.
5,067,413 A 11/1991 Kiuchi et al.
5,127,599 A * 7/1992 Veraart ..................... 246/182 R
5,160,012 A 11/1992 Jonke
5,193,965 A 3/1993 Soros
5,215,422 A 6/1993 Snead
5,421,687 A 6/1995 Wayman
5,501,563 A 3/1996 Grathoff
5,564,878 A 10/1996 Kay
5,632,589 A 5/1997 Bray et al.
5,676,514 A * 10/1997 Higman et al. ............... 414/339
5,832,856 A 11/1998 Giles
(Continued)

*Primary Examiner* — Khoi Tran
*Assistant Examiner* — Stephen Holwerda
(74) *Attorney, Agent, or Firm* — Allen, Dyer, Doppelt, Milbrath & Gilchrist, P.A.

(57) ABSTRACT

A train is driven by drive stations positioned along a track for frictionally contacting side plates on the train. The drive speed is controlled in response to sensors located at each drive station sensing a position of a wheel and a side plate for confirming a presence of the train. A start command is transmitted from the drive station driving the train to a second drive station downstream when a lead car is within a preselected distance from the second drive station. The drive station at the second drive station is quickly accelerated to a target speed for synchronizing the first drive station with the second drive station. After receiving the train, the second drive station then transmits a stop command to the first drive station for fast decelerating the drive station to a stop.

17 Claims, 17 Drawing Sheets

U.S. PATENT DOCUMENTS

| | | | |
|---|---|---|---|
| 5,839,565 | A | 11/1998 | McFall |
| 5,871,324 | A | 2/1999 | Horak |
| 6,132,156 | A | 10/2000 | Shehata |
| 6,698,990 | B1 | 3/2004 | Dobner et al. |
| 6,792,872 | B1 | 9/2004 | Valdespino |
| 7,092,788 | B2 | 8/2006 | Brixius et al. |
| 7,192,238 | B2 | 3/2007 | Theurer |
| 2002/0197135 | A1 | 12/2002 | Arntzen et al. |
| 2003/0226470 | A1 * | 12/2003 | Dibble et al. .................. 105/96 |
| 2004/0018073 | A1 | 1/2004 | Theurer et al. |
| 2005/0067207 | A1 * | 3/2005 | Radtke et al. ................ 180/223 |
| 2005/0281643 | A1 | 12/2005 | Villar et al. |
| 2006/0005736 | A1 | 1/2006 | Kumar |
| 2006/0096835 | A1 | 5/2006 | Bellezza |
| 2006/0162608 | A1 * | 7/2006 | Dibble ........................... 104/96 |
| 2006/0163545 | A1 | 7/2006 | Newman |

* cited by examiner

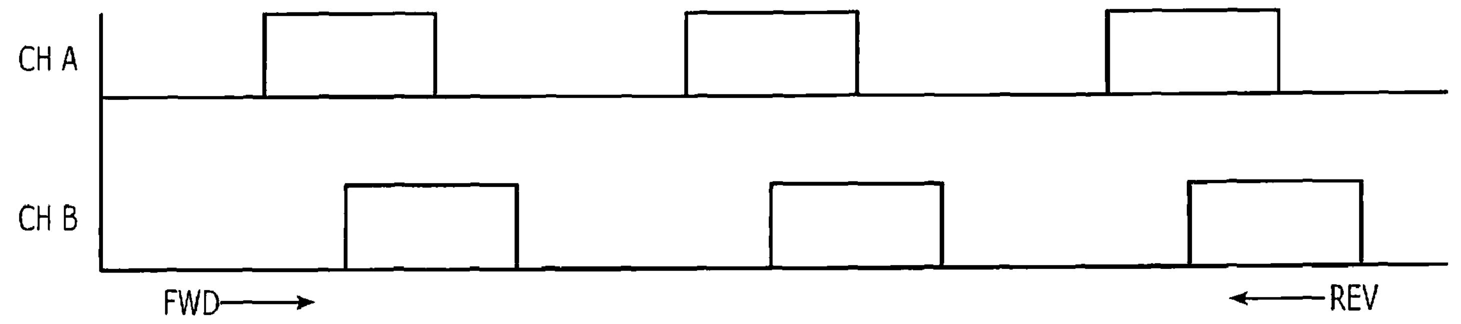

1. AS THE WHEELS OF THE RAIL-VEYOR TRAIN MOVE PAST WHEEL SENSORS A & B, SIGNALS ARE GENERATED AS SHOWN ABOVE DEPENDING ON THE DIRECTION OF TRAVEL. IN THE FORWARD DIRECTION, SENSOR A WILL BE ACTIVATED BEFORE SENSOR B. IN THE REVERSE DIRECTION, SENSOR B WILL BE ACTIVATED BEFORE SENSOR A.

2. A WHEEL EDGE COUNTER IS INCREMENTED IN THE FOLLOWING MANNER:
   - COUNT UP ONE COUNT ON POSITIVE EDGE ⌐ OF SENSOR A WITH SENSOR B LOW.
   - COUNT UP ONE COUNT ON NEGATIVE EDGE ¬ OF SENSOR A WITH SENSOR B HIGH.
   - COUNT DOWN ONE COUNT ON POSITIVE EDGE ⌐ OF SENSOR A WITH SENSOR B HIGH.
   - COUNT DOWN ONE COUNT ON NEGATIVE EDGE ¬ OF SENSOR A WITH SENSOR B LOW.

3. WHEEL COUNTER= WHEEL EDGE COUNTER / 2. THE WHEEL COUNTER REPRESENTS THE POSITION OF THE TRAIN RELATIVE TO THE DRIVE STATION.

4. THE TRAIN SENSOR SENSES THE PRESENCE OF THE TRAIN'S SIDE PLATE.

FIG. 11

METHOD OF CONTROLLING A RAIL TRANSPORT SYSTEM FOR CONVEYING BULK MATERIALS

CROSS REFERENCE TO RELATED APPLICATIONS

This application claims the benefit of and priority to U.S. Provisional Patent Applications having Ser. No. 60/871,232 for "Method of Controlling a Rail Transport System for Bulk Materials" filed on Dec. 21, 2006 and Ser. No. 60/909,971 for "System and Method of Controlling a Rail System having a Train for Transporting Bulk Materials" filed on Apr. 4, 2007, the disclosures of which are herein incorporated by reference in their entirety, and commonly owned.

FIELD OF THE INVENTION

The present invention generally relates to system for driving a train having no internal drive, and in particular to a system and method of controlling multiple trains through a loading and unloading of bulk materials.

BACKGROUND OF THE INVENTION

Method and apparatus for moving bulk materials in conventional trains, trucks, conveyor belts, aerial tramways or as a slurry in a pipeline are well known and are typically used in various industries because of site-specific needs or experience. In the minerals and aggregate industries, for example, bulk materials are moved from mining or extraction sites to a process facility for upgrading or sizing. Trucks had been the system of choice for many years for moving bulk materials. Trucks were enlarged for off road vehicles because of their efficient transport of bulk materials and increased capacity. These vehicles, however, are limited to site specific applications and are provided at a high capital cost. Major off road trucks have evolved that require very wide roadways for passing each other, are not energy efficient per ton-mile of material transported, have limited hill climbing ability, and are dangerous because of potential of operator error as well as being environmentally unpleasant neighbors.

Trains have been used for many years for bulk material transport in hopper cars. Because of low friction, the use of free rolling iron or steel wheels on steel tracks they are very efficient users of energy but are limited in capacity relative to the drivers or locomotives required. Large tonnage long trains use multiple drivers that are heavy units, which dictate the weight of rail and ballast requirements. All railroads must be designed for the weight of the drivers or locomotives included fuel, not the combination of car plus loads, which are significantly less. The drivers need to be of sufficient weight so that the rotary drive tire makes contact with the stationary rail and must have sufficient friction to produce forward or reverse movement of what will include heavily loaded cars. The inclination capable of conventional railroad systems is limited to the friction between the weighted drive wheels and track. Rail cars are individual units that each has to be loaded in a batch process, one car at a time. Bulk materials can be unloaded from hopper cars by opening bottom dump hatches or can be individually rotated to dump out of the top. Spotting cars for both loading and unloading is time consuming and labor intensive.

Although moving from one location to another may be cost effective, the added cost of batch loading and unloading stages in shorter distance transports reduces the rail transport cost effectiveness. With normal single dual track train systems only one train can be used on a system at a time.

Conveyor belts have been used for many years to move bulk materials. A wide variety of conveyor belt systems exist that can move practically every conceivable bulk material. Very long distance single belt runs are very capital cost intensive and are subject to catastrophic failure when a belt tears or rips, typically shutting down the entire system and dumping the carried load, requiring cleanup. Conveyor belts are relatively energy efficient but can require high maintenance because of an inherent problem of multiple idler bearings requiring constant checking and replacement. Short distance conveyor belts are commonly used in dry or clamp transport of almost all types of materials. Because conveyor belts are very flexible and desirably operated over fairly flat terrain, they are not efficient at transporting moderately high solids slurry where water and fines can accumulate in low spots and spill over the side creating wet spilled slurry handling problems.

Some bulk materials can be transported in pipelines when mixed with water to form slurry that is pushed or pulled with a motor driven pump impeller in an airless or flooded environment. The size of the individual particles that are present in the bulk materials dictates the transport speed necessary to maintain movement. For example, if large particles are present then the velocity must be high enough to maintain movement by saltation or skidding along the bottom of the pipe of the very largest particles. Because pipelines operate in a dynamic environment, friction is created with the stationary pipe wall by a moving fluid and solid mass. The higher the speed of the moving mass the higher the friction loss at the wall surface requiring increased energy to compensate. Depending on the application, the bulk material has to be diluted with water initially to facilitate transport and dewatering at the discharge end.

Light rail, narrow gage railroads for transporting bulk material from mines and the like is known as described by way of example with reference to U.S. Pat. No. 3,332,535 to Hubert et al. wherein a light rail train made up of several cars is propelled by drive wheels and electric motors combinations, dumping over an outside loop. By way of further example, U.S. Pat. No. 3,752,334 to Robinson, Jr. et al. discloses a similar narrow gage railroad wherein the cars are driven by an electric motor and drive wheels. U.S. Pat. No. 3,039,402 to Richardson describes a method of moving railroad cars using a stationary friction drive tire.

While the above described transport systems and methods have specific advantages over conventional systems, each is highly dependent upon a specific application. It has become apparent that increases in labor, energy and material costs plus environmental concerns that alternate transport methods need to be applied that are energy and labor efficient, quiet, non-polluting, and esthetically unobtrusive. US Patent Publications US 2003/0226470 to Dibble et al. for "Rail Transport System for Bulk Materials" and US 2006/0162608 to Dibble for "Light Rail Transport System for Bulk Materials" discloses a light rail train utilizing an open semi-circular trough train with improved drive stations, the disclosures of which are herein incorporated by reference in their entirety. Such a light rail system offers an innovative alternative to the above mentioned material transport systems and provides for the transport of bulk materials using a plurality of connected cars open at each end except for the first and last cars, which have end plates. The train forms a long open trough and has a flexible flap attached to each car and overlapping the car in front to prevent spillage during movement. The lead car has four wheels and tapered side drive plates in the front of the car to facilitate entry into the drive stations. The cars that follow have two wheels with a clevis hitch connecting the front to the rear of the car immediately forward. Movement of the train is provided by a series of appropriately placed drive stations having drive motors on either side of the track which are AC electric motors with drive means such as tires to provide frictional contact with the side drive plates. At each drive station, each drive motor id connected to an AC inverter and controller for drive control, with both voltage and frequency being modified as needed. The electric motors each turn a tire in a horizontal plane that physically contacts two parallel side drive plates external of the wheels of each car. Pressure on the side drive plates by these drive tires converts the rotary motion of the tires into horizontal thrust. The wheels on the cars are spaced to allow operation in an inverted position by use of a double set of rails to allow the cars to hang upside down for unloading. By rotating this double track system the unit train can be returned to it normal operating condition. Such a system is well known and commercially referred to as Rail-Veyor™.

Flanged wheels are symmetrical to the side drive plates allowing operation in an inverted position which, when four rails are used to encapsulate the wheel outside loop discharge of the bulk material is possible. By using elevated rails, the train can operate in the inverted position as easily as in the convention manner.

Yet further, drives for such light rail systems have been developed as described in U.S. Pat. No. 5,067,413 to Kiuchi et al. describing a device for conveying travelable bodies which are provided no driving source, on a fixed path. A plurality of travelable bodies travels on the fixed path while aligned substantially in close contact with each other. Traveling power is transmitted to one of a plurality of travelable bodies which is positioned on at least one end of the alignment. The traveling power drives the travelable body with frictional force while pressing one side surface of the travelable body, and is transmitted to the travelable body while backing up the other side surface of the travelable body. A device to transmit traveling power is arranged on only a part of the fixed path.

While light rail systems such as the Rail-Veyor™ above described are generally accepted, there is a need to provide such system having high efficiency and reliability with regard to controlling the movement of the train and in particular multiple trains with the bulk material transport system. The present invention is directed to controlling such light rail systems in an efficient and reliable manner.

SUMMARY

An embodiment of the invention, herein using the Rail-Veyor™ system by way of example, provides improved control through inter-drive station communications providing the ability of one drive station to communicate both train speed and position data to cooperating drive stations. A high speed communications network may preferably be employed. The control system of the present invention may include redundant position sensors for reliably determining a precise train location. With knowledge of the precise train location, desirably adjusting train spacing for multiple trains is accomplished with confidence and efficiency. The control system of the present invention controls the acceleration and deceleration of a train over multiple drive stations and thus permits smaller horse power drives than typically used, thus resulting in higher efficiency and lower system hardware costs.

By way of example for one embodiment in keeping with the teachings of the present invention may comprise a series of interconnected cars creating a free rolling train that forms a long open trough which may move along a light rail track in a loop from a loading point to a discharge site, and back to the loading point without stopping. This loop allows multiple trains to run on the same track. This feature significantly increases capacity by simply adding more trains without the need to add additional drive stations, thus increasing capacity at a comparably lower incremental cost.

For an embodiment herein described by way of example, each car has two rear wheels with a front and rear ball/clevis connection that allows connection of the cars thus forming the train. Each car also has horizontal drive plates on both sides, outside of the wheels, which roll on the track. A urethane flap is used to seal the gap between the cars allowing significant flexibility when the train moves over undulating terrain. Forward motion is provided by a series of opposing stationary drive stations located on either side of the train so that the train is always in contact with a drive station. Each drive station provides sufficient pressure on the side plates to prevent slipping. The drive tires are each rotated through a gear reducer and A-C electric motor. Motor speeds are controlled with a Variable Frequency Drive (VFD). Since the track between the loading point and the discharge point is continuous, multiple trains can be operating at the same time. Material is loaded on the train, transported to the unload site, discharged through a vertical outside loop, and returned to the loading site to repeat the cycle. The system is designed for continuous operation. As long as the feed bin is kept full and the discharged material is removed, Rail-Veyor™ needs no intervention from the operator.

A method aspect of the invention may comprise controlling movement of a train along a track, wherein the train is driven by a plurality of drive stations positioned along the track, and wherein the train includes a lead car and a rear, each car having wheels for rolling along the track and each car having a side plate thereon, each of the plurality of drive stations having a drive tire positioned for making frictional contact with the side plates at preselected intervals for moving the train along the track. One method comprising providing first and second sensors at each of the plurality of drive stations, positioning the first sensor for sensing a position of a wheel of each car rolling along the track at the drive station, positioning the second sensor for sensing a presence of the side plate, operating a first drive station of the plurality of driver stations for moving the train along the track at a preselected speed, sensing at least one of a leading wheel of the lead car and a trailing wheel of the rear car, the first drive station accelerating the train to a target speed and driving the train at the target speed toward a second drive station of the plurality of drive stations, sensing the wheels as each wheel of the train passes the first sensor for determining a position of the train relative to the first drive station, sensing a leading edge of a first side plate carried by the lead car, wherein the leading edge sensing provides a signal confirming the train is present, transmitting a fast acceleration command signal to the second drive station when the lead car is within a preselected distance from the second drive station, wherein the start signal is initiated based on a train length and a presence thereof resulting from signals from the first and second sensors, fast accelerating the drive tire at the second drive station to the target speed for synchronizing the first drive station with the second drive station, receiving the train at the second drive station for continuing to drive the train, sensing the wheels as each wheel of the train passes the first sensor at the second drive station for determining a position of the train relative to the second drive station, sensing the leading edge of the first side plate by the second sensor at the second drive station for confirming a presence of the train, and transmitting a stop command to the first drive station for fast decelerating the drive tire of the first drive station to a stop.

An alternate method may comprise providing a sensor pair including an upstream sensor and a downstream sensor mounted in a plane generally parallel to the track in such a manner so as to allow the sensor pair to provide quadrature detection in counting of wheels of the trains as the wheels pass the drive station, operating a first drive station of the plurality of driver stations for moving the train along the track at a preselected speed, sensing the wheels of the train as the train passes the first drive station, the first drive station accelerating the train to a target speed and driving the train at the target speed toward a second drive station of the plurality of drive stations, sensing each wheel of the train passing the sensor pair for determining a position and direction of movement of the train relative to the first drive station, transmitting a start command signal to the second drive station when the lead car is within a preselected distance from the second drive station, wherein the start command signal is initiated based on a train length, accelerating the drive element of the second drive station to the target speed for synchronizing a speed of the drive element of the first drive station with a speed of the drive element of the second drive station, receiving the train at the second drive station for continuing to drive the train, sensing each wheel of the train passing the second drive station for again determining a position and direction of travel of the train relative to the second drive station, and responsive to the second drive station driving the train, transmitting a stop command to the first drive station for bringing the drive element of the first drive station to a stop.

BRIEF DESCRIPTION OF THE DRAWINGS

Embodiments of the invention are described by way of example with reference to the accompanying drawings and photographs in which:

FIG. 11 is a diagrammatical illustration of a sensor response to wheels passing a sensor pair;

DETAIL DESCRIPTION OF EMBODIMENTS

The present invention will now be described more fully hereinafter with reference to the accompanying drawings, in which embodiments of the invention are shown. This invention may, however, be embodied in many different forms and should not be construed as limited to the embodiments set forth herein. Rather, the embodiments herein presented are provided so that this disclosure will be thorough and complete, and will fully convey the scope of the invention to those skilled in the art.

By way of example, a control system in keeping with the teachings of the present invention is herein described using the Rail-Veyor™ system. Other applications may include underground mining operations where the loaded train is stacked on top of an inverted empty return train, which reduces the horizontal profile, and an application where the train is connected in a continuous loop like a conventional conveyor without the belt tensioning problems and potential fire risks resulting from drive slippage. As will come to the mind of those skilled in the art, the Rail-Veyor™ may be applied to mass transportation of people, luggage or agricultural products. Although physically different in appearance all the above applications may have the same type of drive systems.

Figure 1:
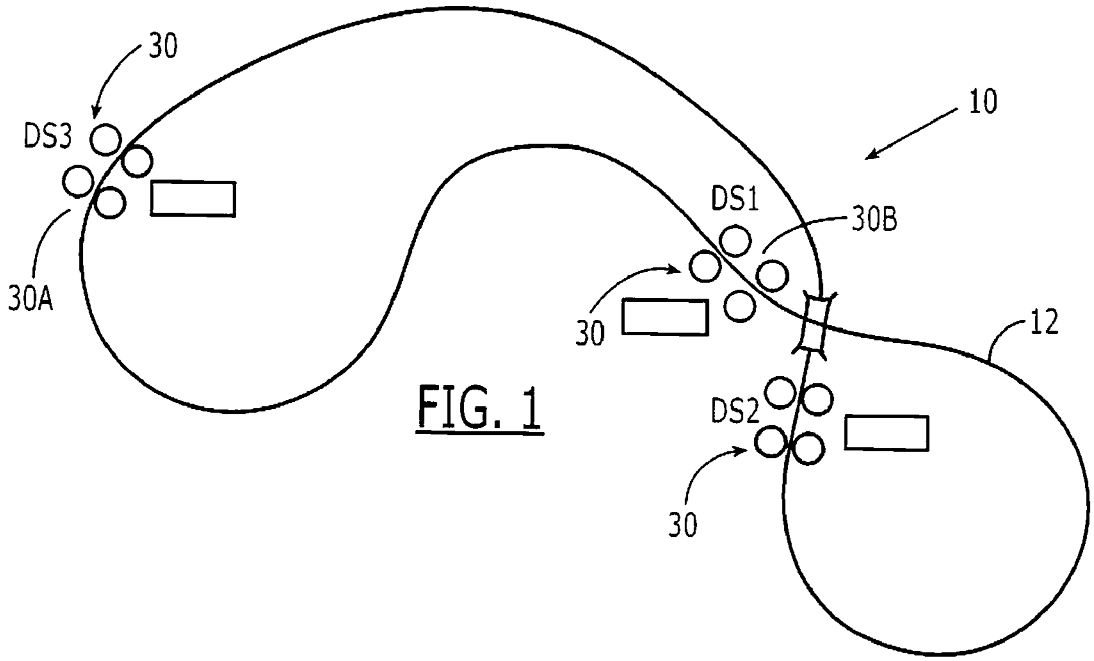
FIG. 1 is a diagrammatical illustration of one rail system in keeping with the teachings of the present invention, as well as an illustration of one monitor display for a control room.
Figure 2:
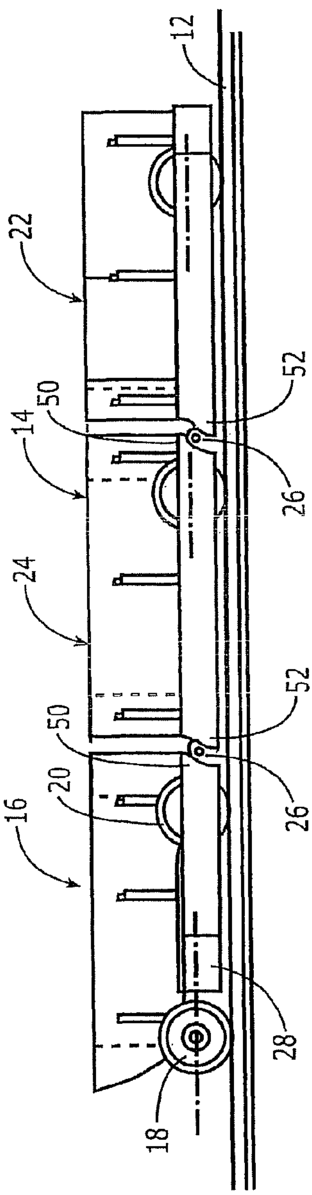
FIGS. 2 and 3 are side and top plan views, respectively, of one embodiment of a train operable with the system of FIG. 1.

With reference initially to FIGS. 1 and 2, one train system 10, in keeping with the teachings of the present invention, comprises a track 12 having parallel rails 12*a*, 12*b*. A train 14 includes a first or lead car 16 having both forward and rear wheel pairs 18, 20 operable on the track 12 for providing a free wheeling movement to the lead car. For the embodiment herein described by way of example, the train includes additional cars described as a second or rear car 22 and an intermediate car 24 or multiple intermediate cars carried between the lead and rear cars. The rear and intermediate cars 22, 24 include a forward pivotal connection 26 for pivotally connecting the intermediate and rear cars to adjacent forward cars. The rear and intermediate cars 22, 24 have only rear wheel pairs 20 operable on the track 12 for providing a free wheeling movement thereto.

Figure 3:
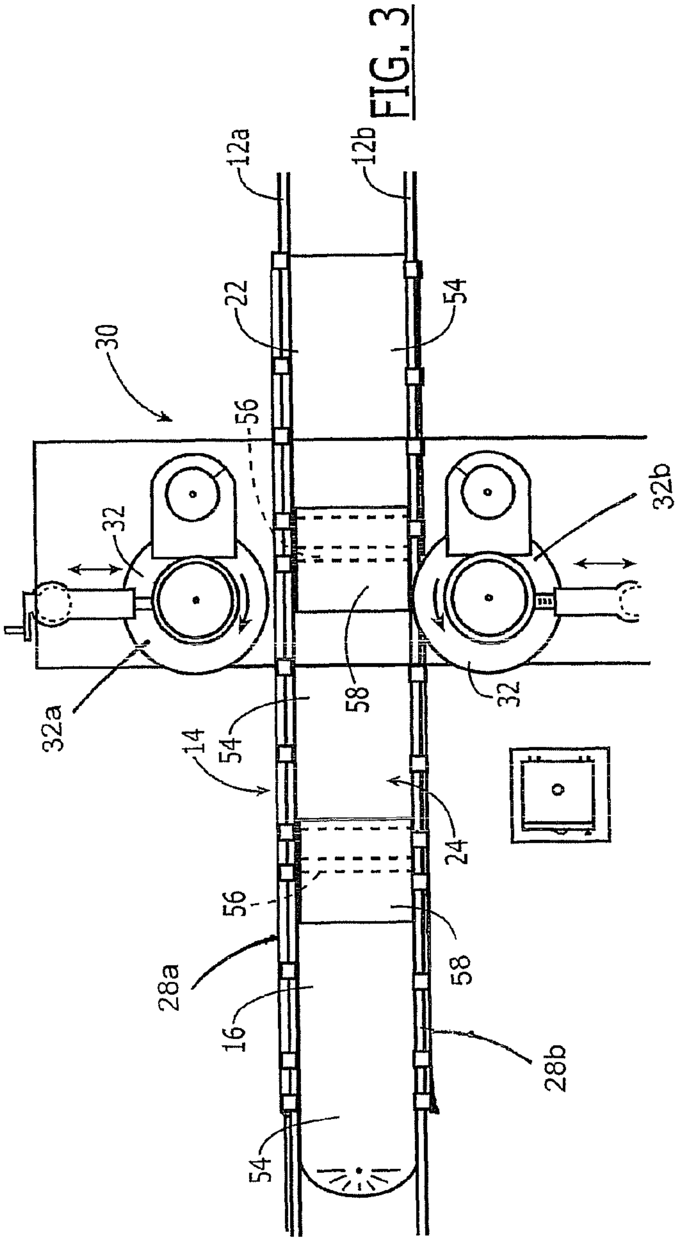

With continued reference to FIG. 2, each of the cars has a side plate 28 affixed thereto. With reference again to FIG. 1, and to FIG. 3, multiple drive stations 30 each have a variable frequency drive (VFD) including a drive tire 32 for frictionally contacting the side plate 28 and imparting a driven movement to each car and thus the train 14. As illustrated with continued reference to FIG. 3, the embodiment herein described includes each car having opposing side plates 28*a*, 28*b* and opposing drive tires 32*a*, 32*b*. Further as illustrated with reference to FIG. 4, an alternate embodiment of the drive station 30 includes opposing drive tire pairs 32P.

Figure 4:
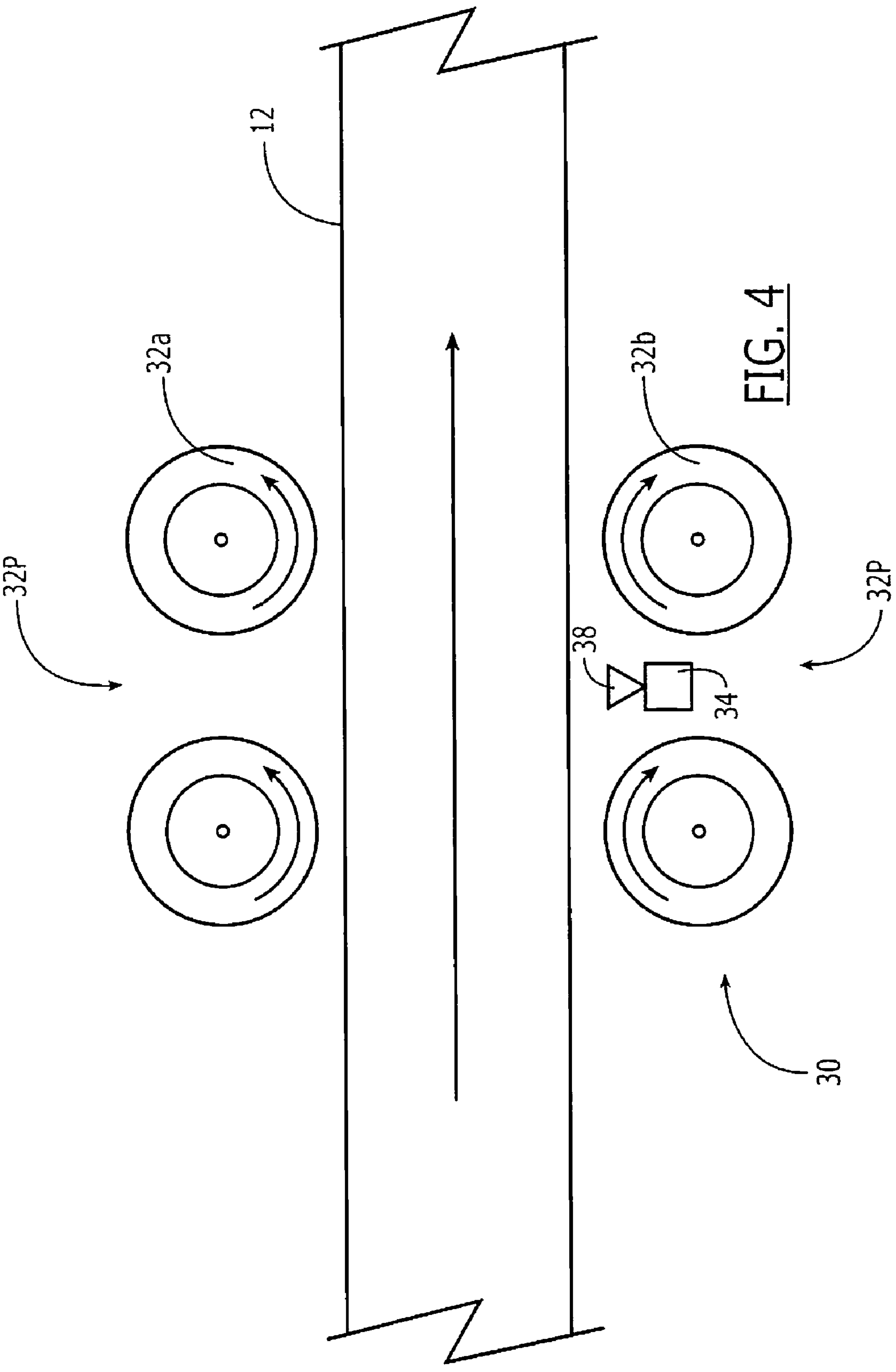
FIG. 4 is a diagrammatical plan view illustrating one drive station and sensor arrangement.
Figure 5A:
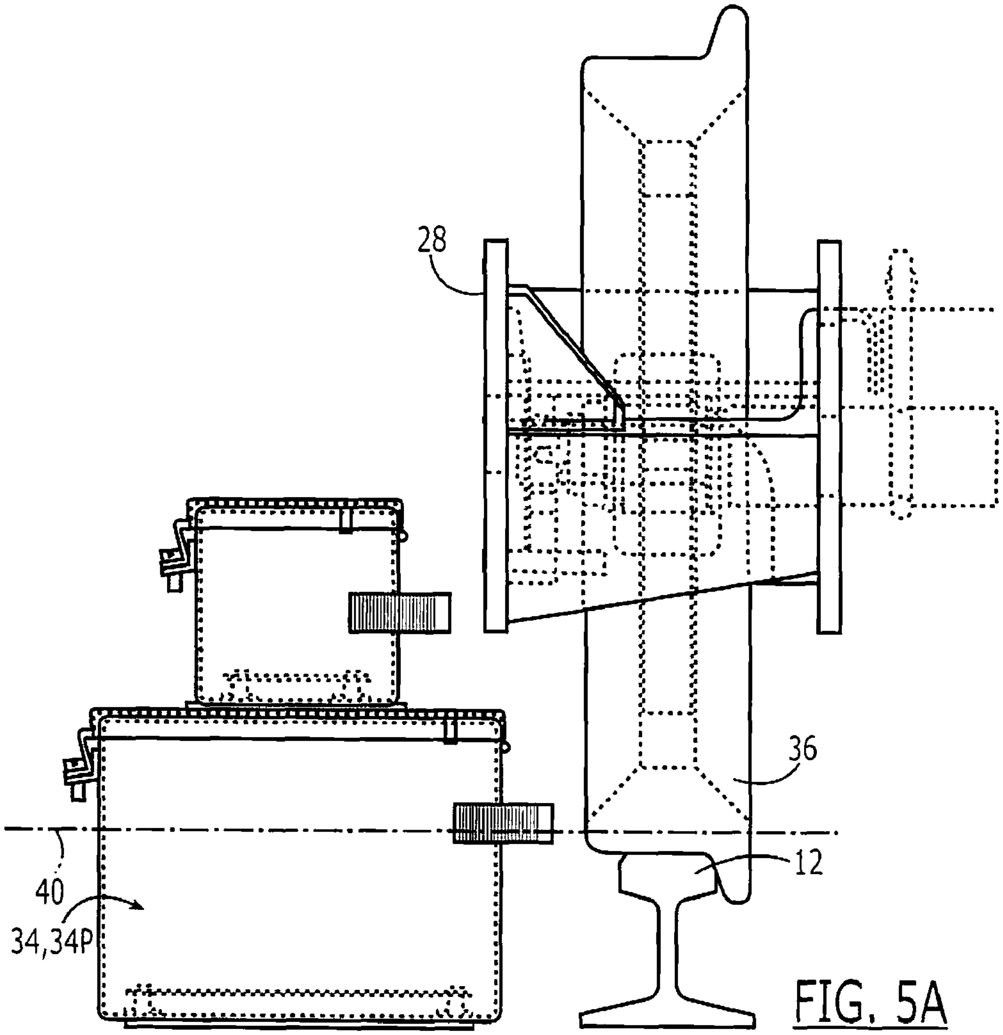
FIGS. 5A-5C illustrate an embodiment of sensors operable within the system for sensing wheels and side plate of the train described with reference to FIG. 2.
Figure 5B:
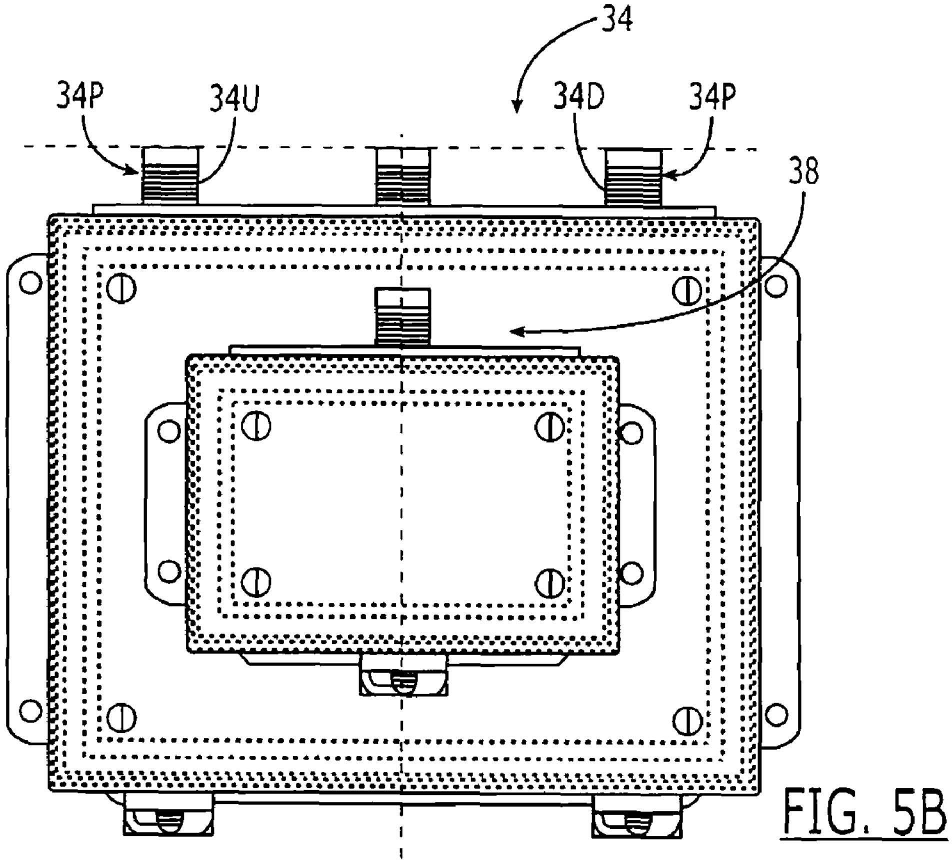
Figure 5C:
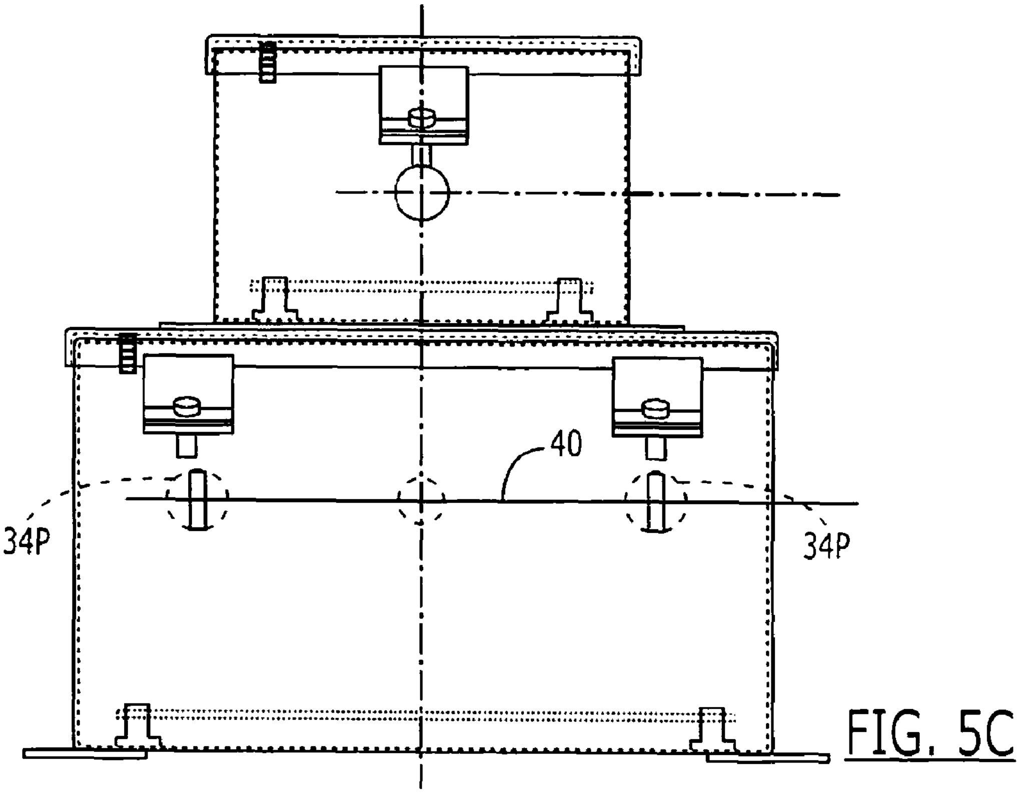

With continued reference to FIG. 4 and to FIGS. 5A-5C, each of the drive stations 30 includes a first sensor 34 positioned for sensing wheels 36 of the train 14 wherein the sensing of the wheels provides an indication of a position and speed of the train as will be described later in greater detail. For the embodiment herein described, each drive station 30 also includes a second sensor 38 positioned for sensing the side plate 28, wherein the sensing of the side plate confirms a presence of the train 14 as will be described in greater detail later in this section. With continued reference to FIGS. 5A-5C, one embodiment of the invention includes first sensor 34 comprising a sensor pair 34P including an upstream sensor 34U and a downstream sensor 34D, wherein the sensor pair is positioned proximate the track and below the second sensor. The sensor pair 34P includes the upstream sensor 34U and the downstream sensor 34D mounted in a plane 40 generally parallel to the track 14 in such a manner to allow the sensor pair to provide quadrature detection in the counting of the wheels 36 as the wheels pass the drive station 30. The sensors 34, 36 may comprise proximity sensors or those desired to meet conditions as determined by those skilled in the art now having the benefit of the teachings of the present invention.

Figure 6:
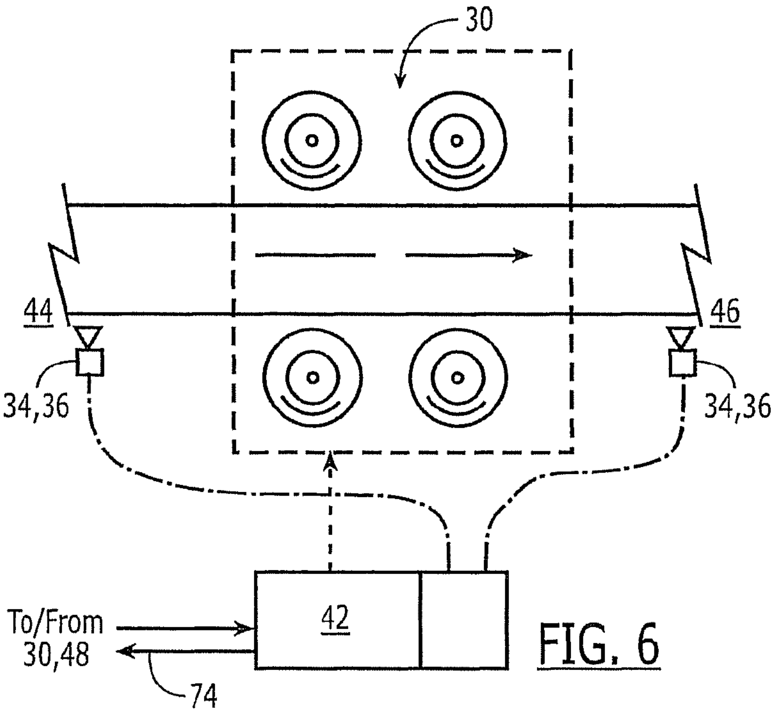
FIG. 6 is a diagrammatical plan view illustrating an alternate drive station and sensor arrangement.

With reference now to FIG. 6, each drive station 30 includes a controller 42 operable with the sensors 34, 38 with the controller processing signals received from the sensors and transmitting an appropriate command signal regarding speed and presence of the train 14 when being driven by drive station 30A toward drive station 30B, as illustrated with reference again to FIG. 1, and as will be further detailed later in this section. As illustrated with reference again to FIG. 6, the sensors 34, 38 may be duplicated for providing redundancy, and located to sense the train entering 44 the drive station 30 and leaving 46 the drive station.

Figure 7:
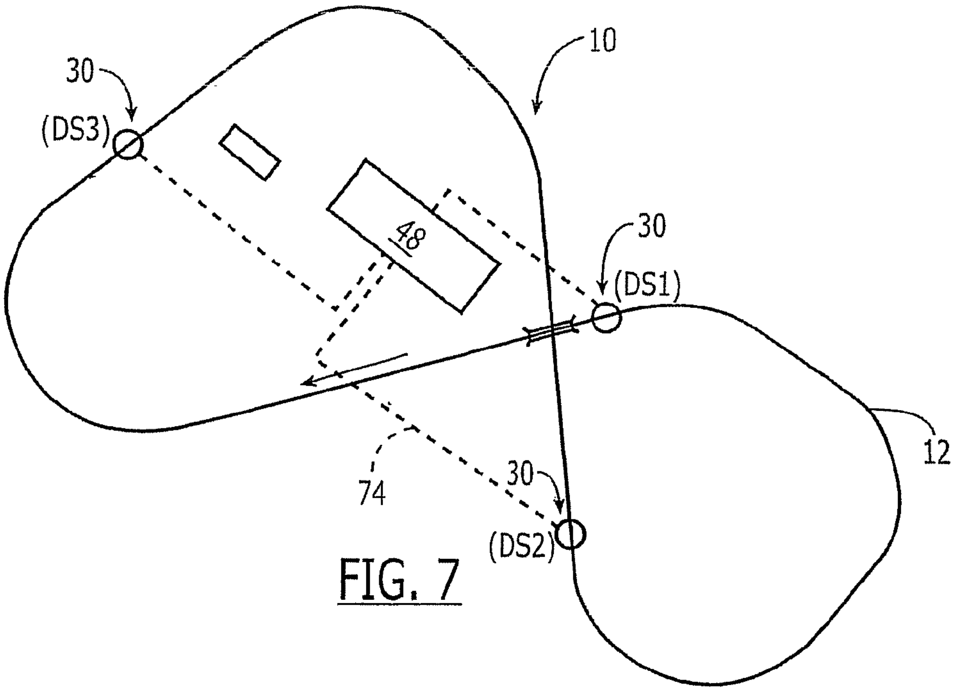
FIGS. 7 and 7A are diagrammatical illustrations alternate track arrangements operable with a control system of the present invention.
Figure 7A:
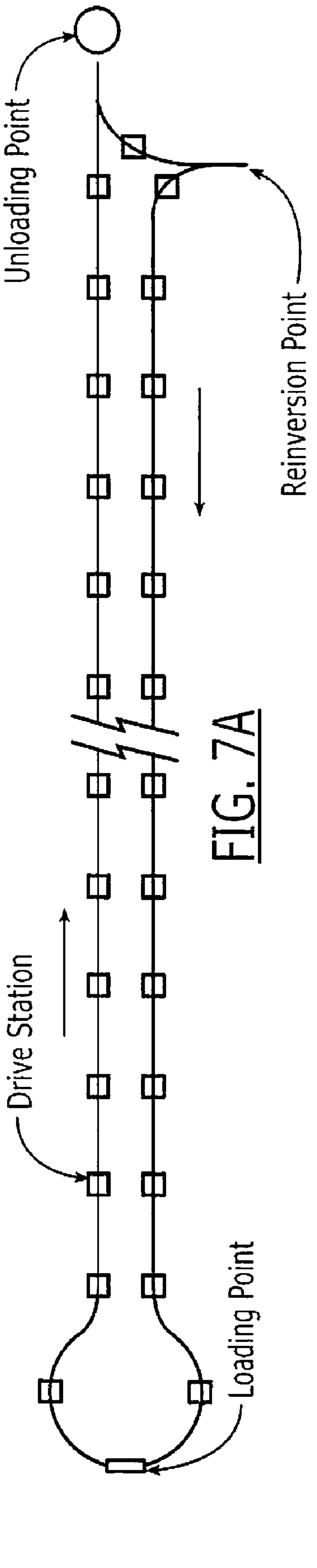

As illustrated with reference again to FIG. 1, and to FIG. 7, adjacent drive stations 30 are spaced along the track 12 a distance equal to an effective length of the train, thus at least one drive station has contact with the train. The drive stations of FIG. 7 are spaced about 400 meters apart, by way of example. With continued reference to FIG. 7, a control center 48 may be remotely located from the drive stations 30 with each of the drive stations communicating with the control center for providing status information, such as train location, train speed, performance of the drive station itself, and the like. As will become more apparent with the detailed discussion about the controlling of the drive stations, the present invention allows the use of multiple trains. Communications from drive station to drive station and to the control center may employ hard wire, optical fiber, and/or radio wave transmissions as is desired for the conditions within which the system is to be operated. For the example illustrated with reference again to FIG. 7, two trains having their lengths substantially equal may be operated within the system 10 comprising at least three drive stations 30 (DS1, DS2, DS3) in communication with each other for driving both trains and maintaining a desirable spacing between the trains. As will come to the mind of those skilled in the art, now having the benefit of the teachings of the present invention, alternate track and drive station configurations are anticipated including the system described by way of example with reference to FIG. 7A including a reinversion location for reversing the direction of the train or trains traveling within the system.

The drive stations 30 as herein described comprise electric drive motors mounted adjacent to the train with drive tires 32 providing controllable frictional contact with the side plates such that the train can be moved downstream and upstream. A/C inverters and controller connected to every set of drive motors such that the motors may be synchronized through a modifying of at least one of voltage and frequency thereto.

With reference again to FIGS. 2 and 3, and as described in the above cited reference publication US 2003/0226470, a trailing edge of the side plate 28 carried by the lead car 16 includes an offset portion 50 mating with an adjacent offset portion 52 on a leading edge of the side plate for an adjacent car. This allows for a continuous contact by the drive tire 32 between cars during operation yet allows for rotation of adjacent cars during dumping and other transport variables. This also enables the train to be move in both vertical and horizontal plane.

As herein illustrated, the lead car 16 has a trough 54, opposing side plates 28*a*, 28*b* having a reduced distance between them for smooth entrance into opposing drive tires 32*a*, 32*b* of the drive station. The rear car 22 has a trough and opposing side plates 28*a*, 28*b* at a reduced distance between them to reduce shock when the train 14 exits the opposing drive tires 32*a*, 32*b* of the drive station 30. The intermediate cars 24 coupled to the lead car 16 and the rear car 22 by the clevis type coupling has its trough aligned to produce an overall open trough with gaps 56 between cars. A flexible flap 58 extends over the gap 56 between the cars 16, 24, 22.

With reference again to FIGS. 4 and 7, consider one method of controlling movement of the train 14 along the track 12 to include positioning the first sensor 34 for sensing the position of the wheel 36 of each car 16, 22, 24 rolling along the track at the drive station 30 driving the train. As above described, the second sensor 38 senses the presence of the side plate 28 and thus the train 14. As illustrated with reference to FIG. 8, the first drive station 30 (DS1, or Drive N) moves the train along the track 12 at a preselected speed. The first drive station (DS1) accelerates 60 the train to a target speed 62 and drives the train toward a second drive station (DS2, or Drive N+1). The leading wheel of the lead car and a trailing wheel of the rear car are sensed. The sensing of the wheels within the train provides a wheel count. The wheel count is used in determining a train position along the track. By sensing the wheels as each wheel of the train passes the first sensor 34 allows for a determination of the position of the train 14 relative to the first drive station (DS1). Sensing a leading edge of the side plate 28 carried by the lead car 16 provides a signal confirming that the train 14 is present. When the train 14 is determined to be within a certain distance from the second drive station (DS2), a fast acceleration command signal is transmitted from the first drive station (DS1) to the second drive station (DS2), wherein the fast accelerate 64 or start signal is initiated based on a train length and a confirmation of the presence of the train resulting from signals from the first and second sensors. By fast accelerating 64 the drive tire 32 at the second drive station (DS2) to the target speed 62, a synchronizing of the second drive station speed with the first drive station speed is accomplished. When the sensors 34, 38 at the second drive station (DS2) provide a determination that the second drive station (DS2) has received the train by a sensing of the wheels as each wheel of the train passes the first sensor at the second drive station for determining a position of the train relative to the second drive station, and a sensing the leading edge of the first side plate by the second sensor at the second drive station for confirming a presence of the train, a stop command is transmitted to the first drive station for fast decelerating 66 the drive tire 32 of the first drive station to a stop. Once drive station N+1 receives a start command from drive station N, the drive station tire will accelerate to the desired speed prior to the train's arrival at the drive station. As the train passes on to drive station N+2, drive station N+1 will quickly decelerate to zero. In this fashion, the train will pass control from one drive station to another. The transition from one drive station to another is synchronized.

Figure 8:
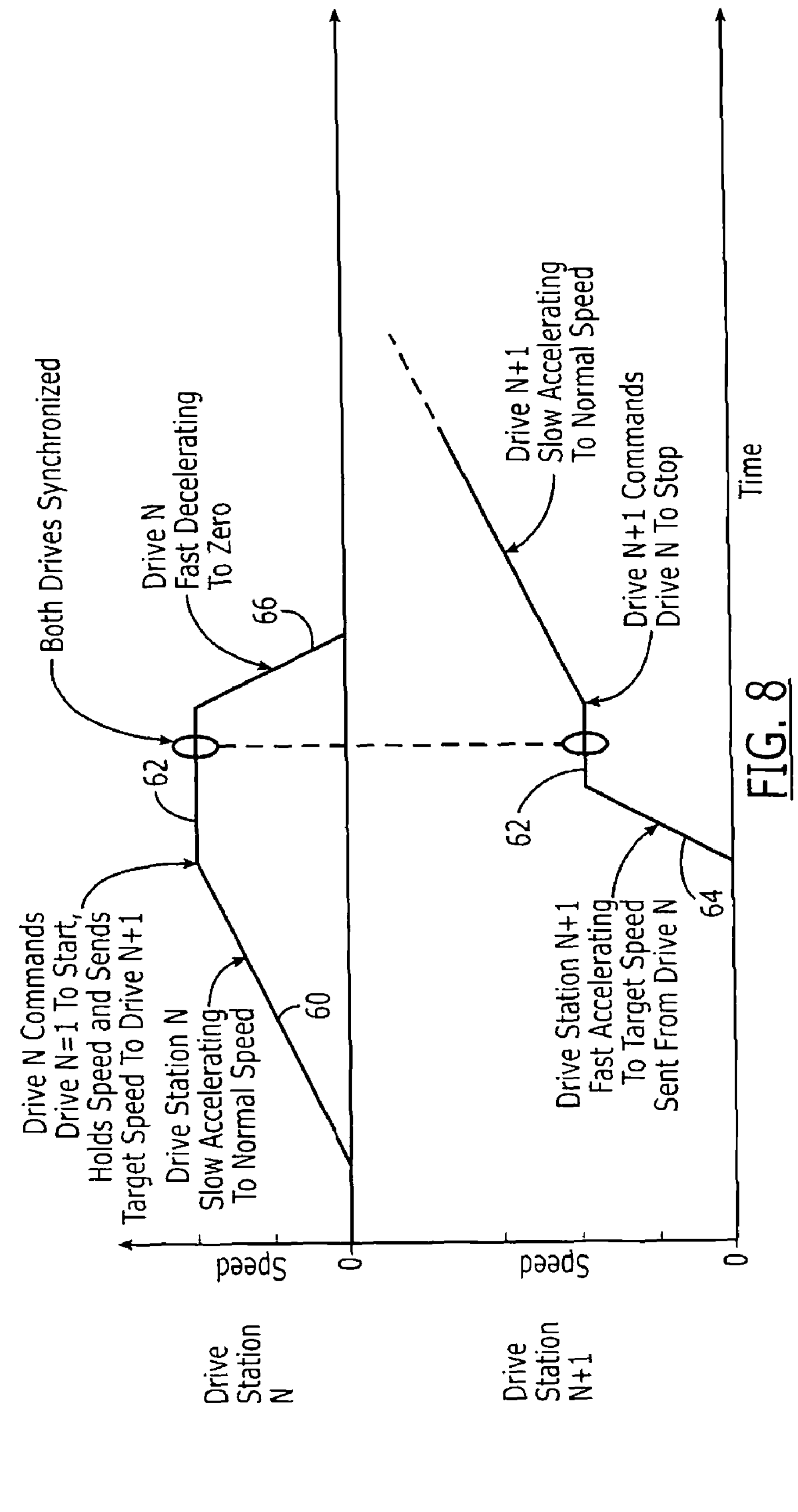
FIG. 8 graphically illustrates speed versus time plots for adjacent drive stations.
Figure 9:
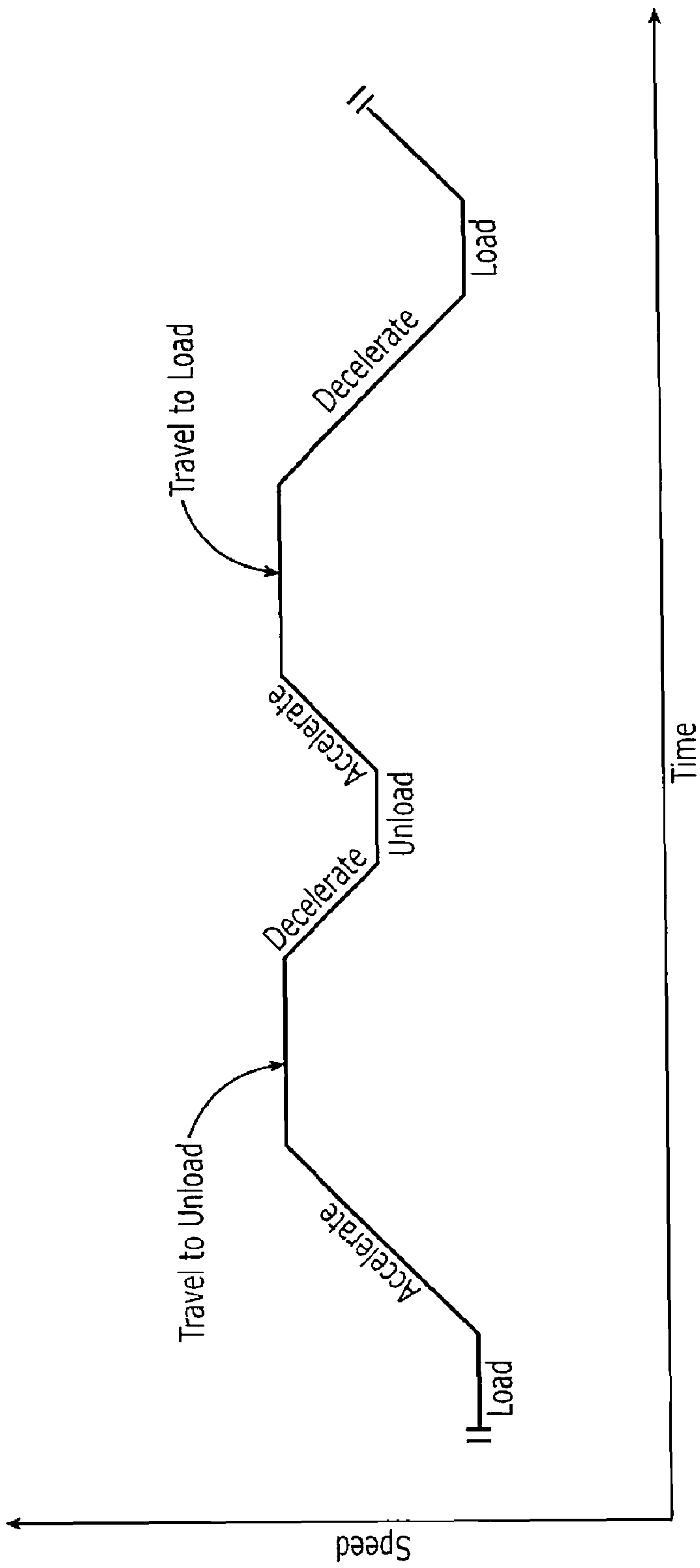
FIG. 9 is a speed versus time plot of a movement of the train from a loading speed to an unloading speed through an acceleration and deceleration.

As illustrated by way of example with reference to FIG. 9, the target speed 62 referenced in FIG. 8 may be a load speed, a travel speed, or an unload speed as is appropriate for the location of the train. Various speeds of the drive tire at the applicable drive station may include a first speed at which the train is loaded, acceleration to a second speed for movement of the loaded train downstream for unloading, deceleration of the loaded train to a third speed for an unloading thereof, acceleration of the unloaded train to the second speed, and deceleration of the train to the first speed for again loading the train.

Figure 10:
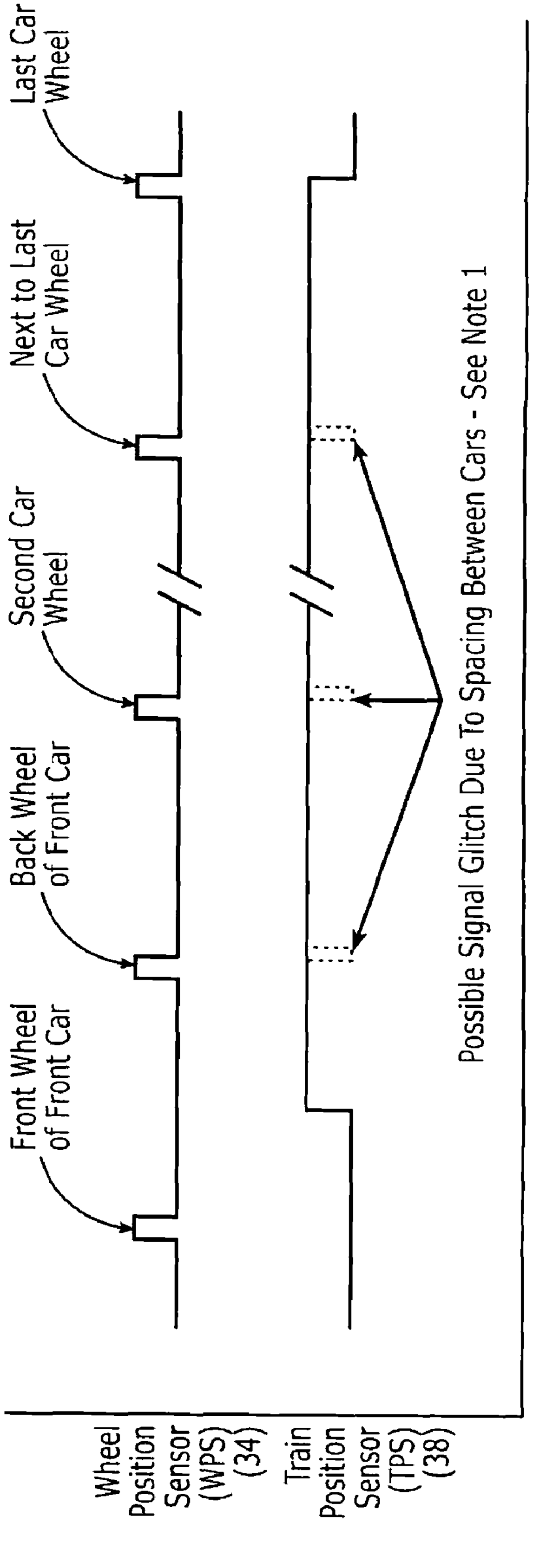
FIG. 10 is a plot of wheel and position sensor responses to sensing wheels and side plates of the train of FIG. 2.

With reference again to FIG. 2, a gap 68 exists between a trailing edge of one side plate 28 on one car 16 and a leading edge of the side plate on an adjacent car 24. This gap 68 produces a disruption in a sensing signal provided by the second sensor 38, as illustrated with reference to FIG. 10. Compensation to the signal from the second sensor corrects for the disruption by using a debounce circuit for determining that the second side plate is present. In essence, the second sensor signal providing "glitches" within what is desirably a constant signal between the leading edge of the side plate of the lead car and the trailing edge of the rear car is accounted for by delaying a transmission of the signal when a high or low transition occurs to determine that the signal is a valid signal, thus causing the glitch signal to be ignored. It is also noted that the first wheel of the lead car is forward a leading edge of the side plate of the lead car, thus the sensing of the first wheel by the drive station occurs before the sensing of the leading edge of the side plate.

As above described with reference to FIGS. 6 and 7, the first and second sensors 34, 38 for each of the drive stations 30 may communicate with the control center 48. A central controller at the control center monitors operations for each of the drive stations by providing at least one of drive tire speed, train location along the track, and speed of the train. A manual override may be included at the central drive station for an operator to have a final command should conditions warrant.

By way of further example, one embodiment of the invention commercially planned for use in a Rail-Veyor™ bulk material transport system 10 is herein described with operating parameters to allow those skilled in the art to appreciate the problems solved by the present invention. The car 16, 22, 24 will typically be (but not limited to) 1.25 to 2.50 meters long with a 0.5 to 1.25 meters wide trough. The Rail-Veyor™ train 14 may comprise 100 to 200 cars connected in series to form the train, each car being 2.5 meters long. If 1.25 meter long cars are used then the number of cars would be doubled. The gap 56 between the cars is sealed with a urethane or equivalent flap 58 that is attached to the leading edge of the trailing car and overlays, but is not connected to, the trailing edge of the lead car. The weight of the carried material on the flap creates an effective seal.

The train 14 can be made as long as is needed by merely adding more intermediate cars 24 and more drive stations 30. The effect of this is to create a long moving trough 54 for bulk material. A system track will typically be divided into an equal number of drive stations with the spacing between stations established by the capacity requirements of the facility with the train length one or two cars longer than the space between drive stations. A train will always be in contact with a drive station to maintain control.

Figure 12:
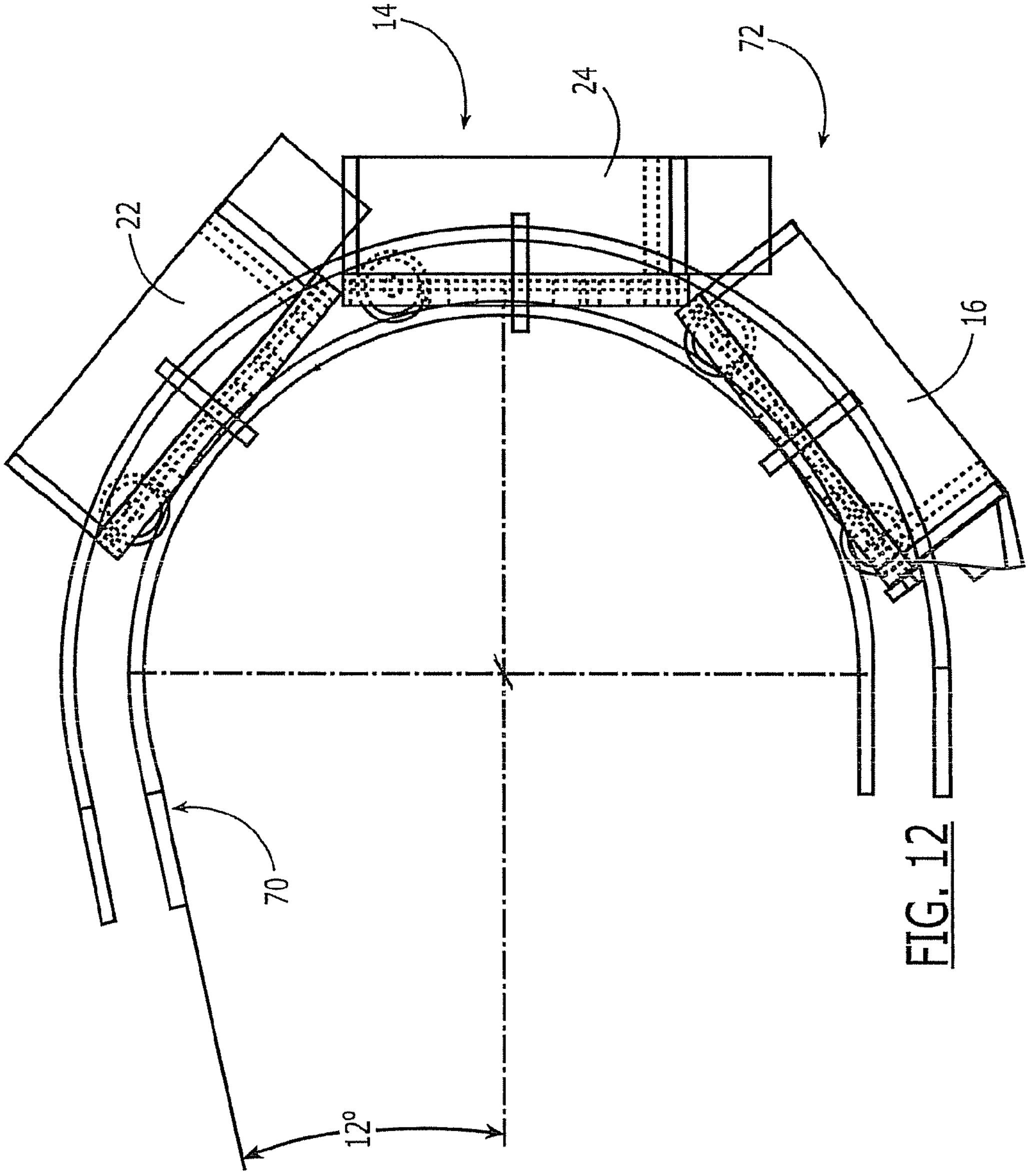
FIG. 12 is a partial side view of a train being driven through an inversion for unloading bulk material carried by the train.
Figure 13:
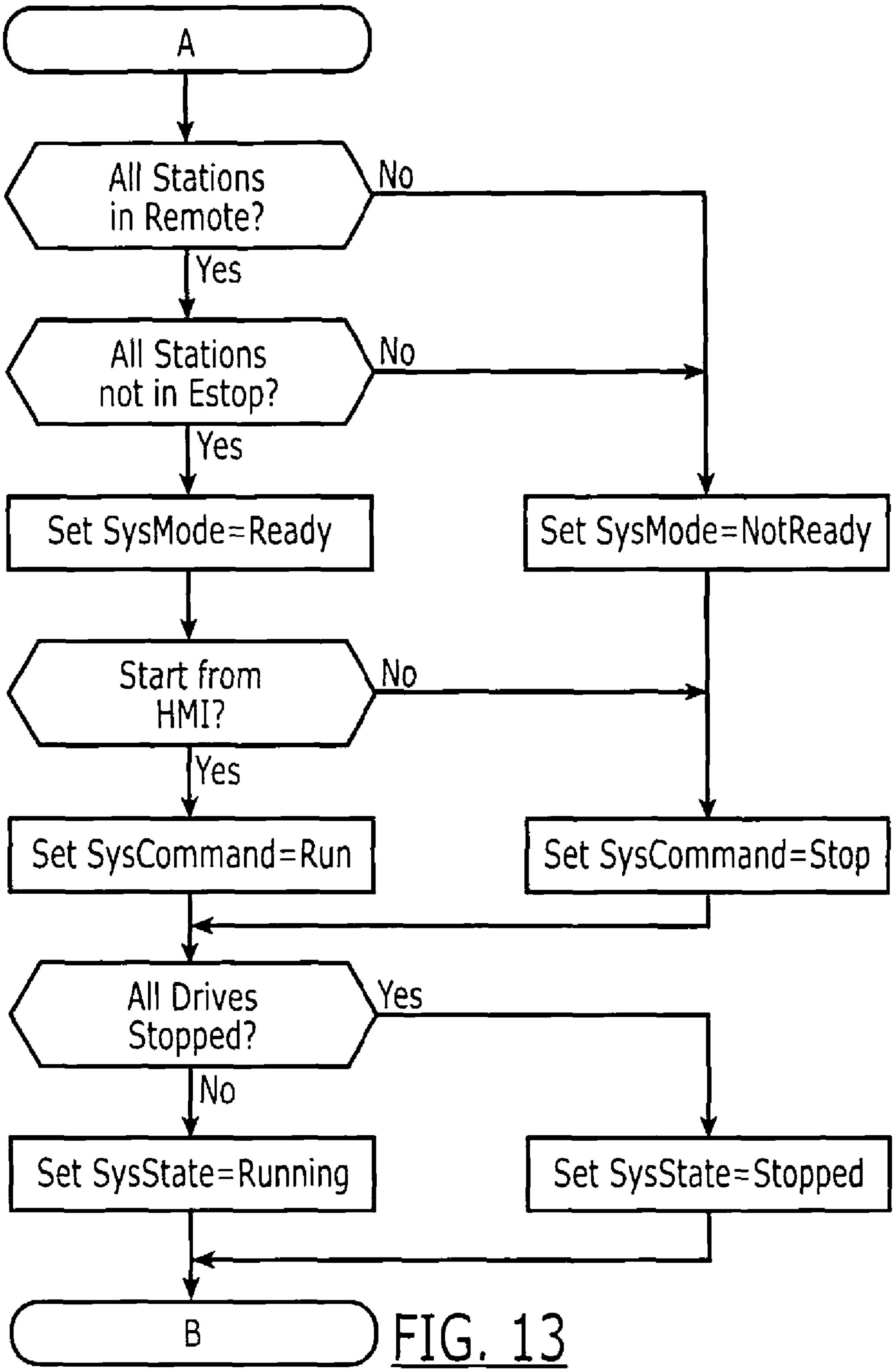
FIG. 13-17 are flow charts illustrating one embodiment of a logic flow control of trains driven with the system, with FIGS. 13 and 14 directed a general system and master control, with FIG. 15 directed to accelerating and decelerating the drive station driving element, and FIG. 17 directed to starting and stopping logic.
Figure 14:
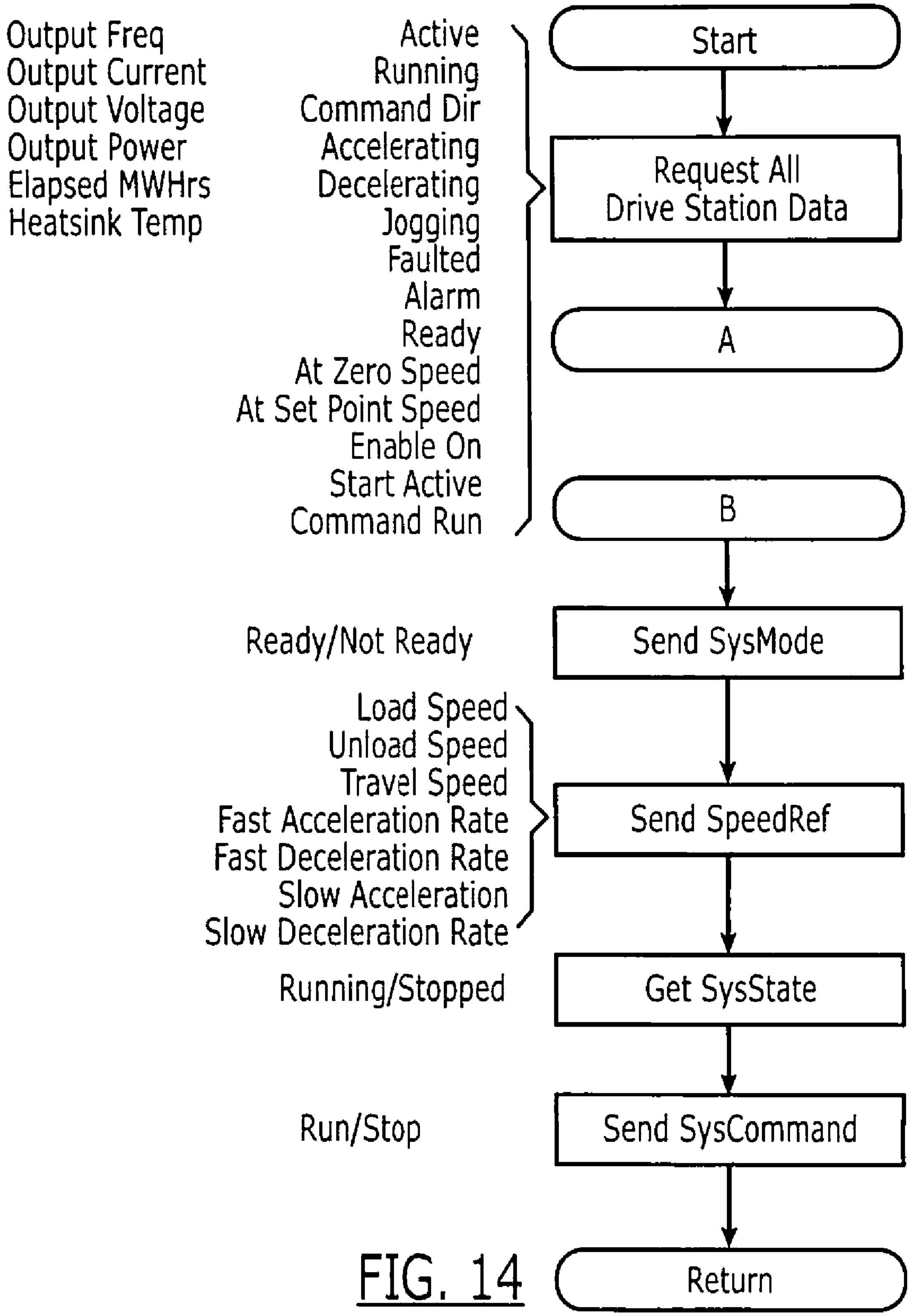
Figure 15:
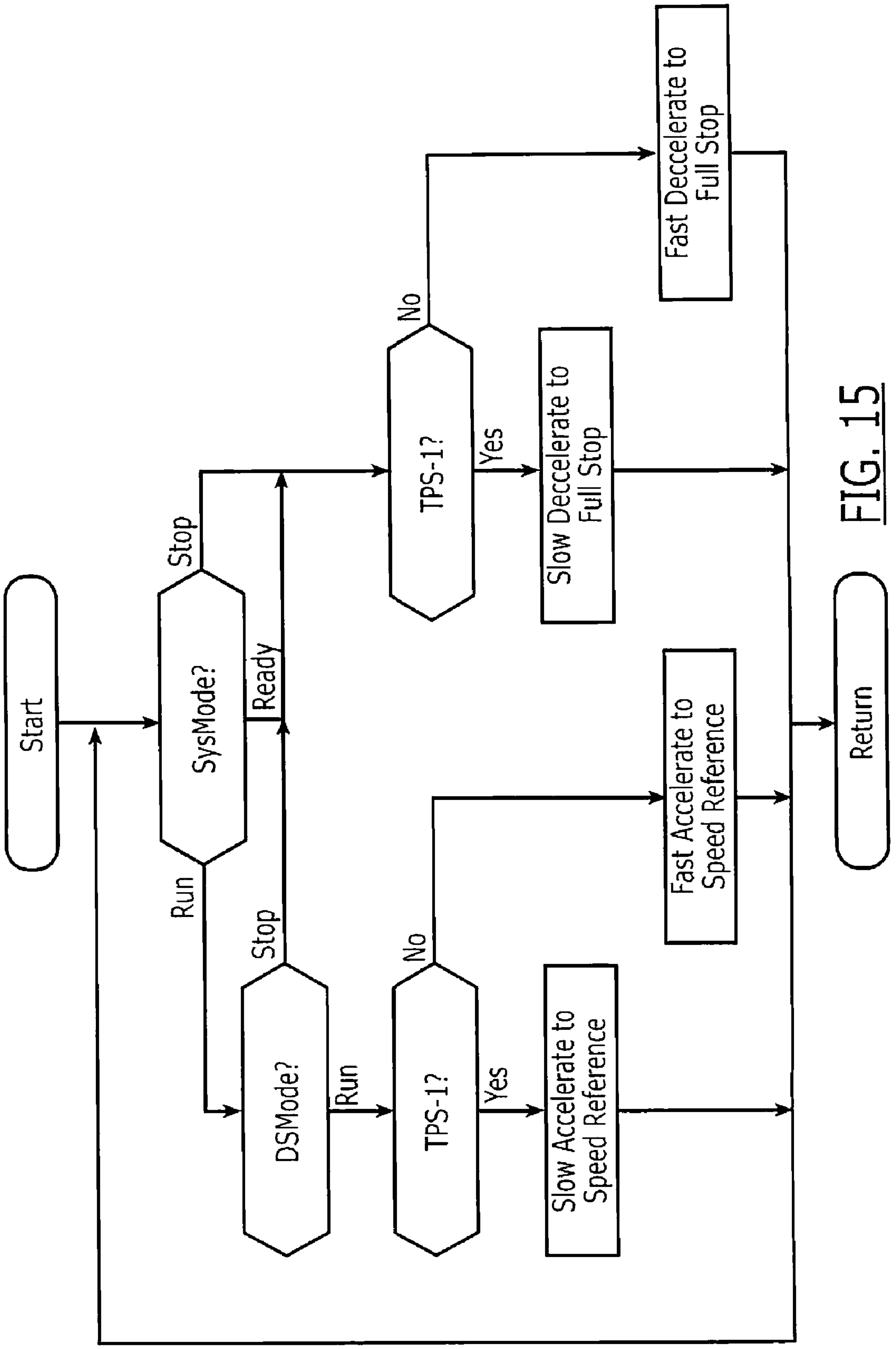
Figure 16:
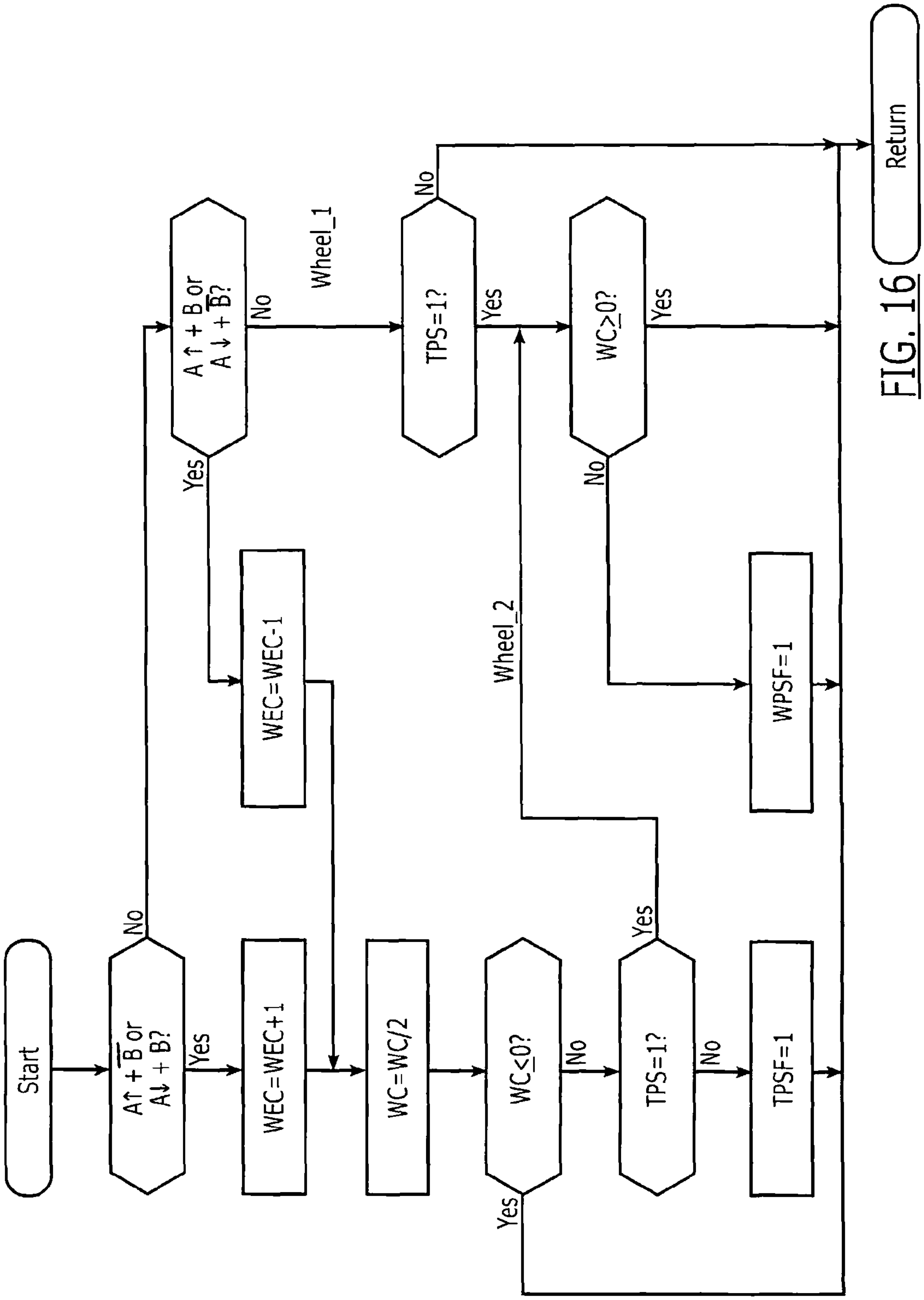
Figure 17:
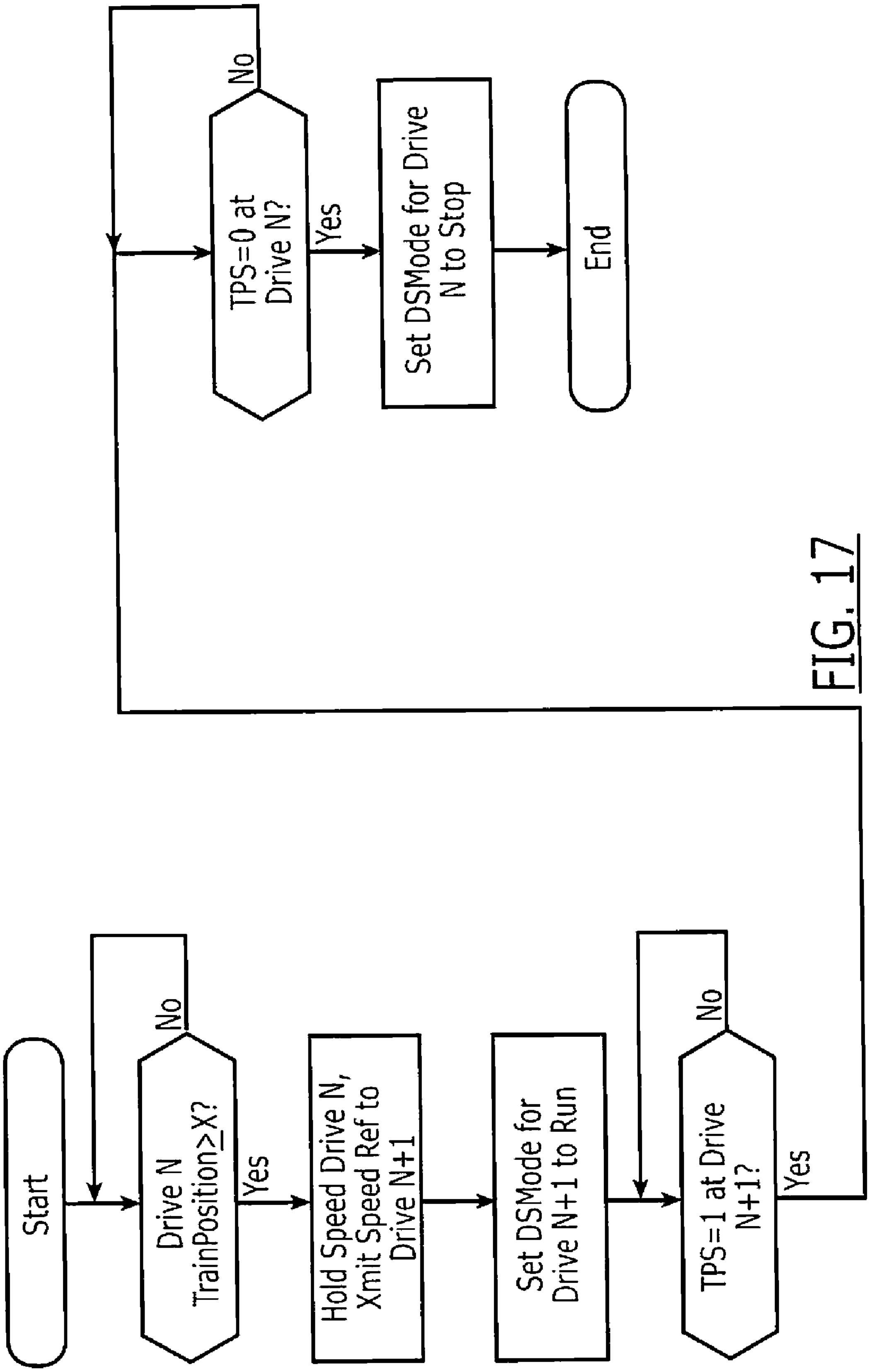

The loading station 30 for the train 14 may be of conventional design as described in U.S. Pat. No. 3,752,334 and U.S. Pat. No. 3,332,535. The same A/C inverter system that controls the drives 30 may also be used to control the loading of the cars. A sensor tells the loading conveyor to start when the train arrives, and to shut down as the train is leaving. The train 14 may be driven up a rail incline to a double rail loop 70 as illustrated by way of example with reference to FIG. 12. As the train 14 inverts 72, it projects outward its particular cargo (bulk material by way of example) and accumulates into a pile. The transported cargo can then be transferred by standard material handling equipment for further operations or sold or stored. The width and length of the each car, and the volume it is capable of carrying, multiplied by the number of cars in a train determines a train's volumetric capacity. The bulk density of this carried material at that volume determines a train's load capacity in tons. The drive station 30 may include from two to four motor/reducers and drive tires that apply opposing pressure to both sides of the cars of the train to provide thrust. The distance between the drive stations need only be slightly less than the length of the train, which is always under the direct control and in contact with a drive station.

With regard to operation of the drive control system, only the drive in contact with the train will preferably be running at any given point in time. The control system uses the trains' location information to make small adjustments in train speed to assure the proper spacing of all trains on the course. With regard to acceleration rate, incline grade and incline length will likely determine the peak horsepower required by the drive motors. Because the control system is capable of communicating drive speed information between drive stations for synchronization purposes, a train need not be fully accelerated before entering the next drive station. In addition, longer acceleration times allow the use of smaller horsepower (lower cost) drive motors.

Drive stations 30 returning empty trains to the loading facility require significantly smaller drives than those required for moving loaded trains. Distances between drive stations will preferably have the same spacing as those driving a loaded train. Drive station spacing is dependent upon the combination of many variables. The system herein described uses Fiber Optic Cable (FOC) 74, as illustrated with reference again to FIGS. 6 and 7, to communicate information between the drive stations 30 and the control center 48. Using FOC also creates a network that is impervious to electrical noise and interference. Further discussion of the network is made in the SCADA/HMI section below. The network provides the means by which a drive station determines the speed of an approaching train. The ability of drive stations to synchronize is a desirable feature of the control system of the present invention.

The following is a discussion of various phases of train control, herein presented by way of example for a SCADA/HMI System, Starting, Running, Loading/unloading, Stopping/braking, and adjusting spacing between trains.

The system 10 may use a Supervisory Control and Data Acquisition (SCADA) System for control of the drive stations. Drive station data from the SCADA system may be presented to an operator(s) in the form of a Human-Machine Interface (HMI) computer located in the control room. The system may be connected to the Internet to provide remote, secure access from anywhere in the world. The HMI presents the operator with information on location of trains, drive power output, train velocity, temperatures, runtime hours, alarm conditions, and the like, and provides the operator with control of all trains.

One embodiment of the system 10 uses multi-mode fiber optic cable (FOC) operating at 100 Mb network with Industrial Ethernet protocol in the form of a self-healing ring for communications from the control room to the drive stations is a daisy chain fashion. A managed network switch is located in the control room. To close the ring, the return connection from the distant end to the control room is a 1 Gb single-mode FOC. Each drive station 30 is controlled by its own Programmable Logic Controller (PLC) 42, which is in turn connected to a network including the control center 48. A Master PLC is located in the control center 48 and has the capability of being made redundant for additional reliability.

A desirable feature of SCADA is its ability to sense alarm conditions. Response to an alarm could be a flashing indicator on the control HMI screen or an audible/visible alarm in the control room requiring attention from the operator. Emails, text messages, and cell phone calls are often sent along with alarms.

The operator may be presented with a graphical representation of the process in the form of a mimic diagram, such as that illustrated with reference again to FIG. 1. Usually the HMI has a System Overview screen, which then allows the operator to "drill down" to a particular area of interest. Animation would show which drives are running and the location of all trains. With regard to starting, in order to reduce the electrical load on the power system, trains are started sequentially. Small adjustments to the train speed are made to adjust train spacing. This adjustment procedure is described below with regarding to the running section.

Since the system 10 including the Rail-Veyor™ has the ability to communicate between drive stations 30, the next drive station will always know the speed of an approaching train and will synchronize to it. The actual acceleration time is determined by site-specific conditions. As earlier described with reference to FIG. 8, drive station N determines when to command drive station N+1 to start. When it does, it holds its current speed and sends the current speed and command to start drive station N+1. Drive station N+1 then quickly accelerates to that speed which synchronizes its speed to that of the approaching train. The unloaded acceleration time is determined by the size and characteristics of the drive motors. Larger motors require longer acceleration times than smaller ones. Additionally, drive station N is constantly monitoring the speed of the train to determine how far in front of the drive station N+1 the command to start will be sent. The drive station N will continue to run until it loses the presence of the train. At this time the drive will quickly decelerate to zero, and wait for a start command as the next train approaches.

For purposes of defining one case study, assume an arbitrary train loading speed of 2 m/s and a running speed of 10 m/s. Under conditions of undulating terrain that result in grades that require higher kW than selected drive station size, the additional power required to ascend the grade is accommodated by adding a drive station at an appropriate position on the grade between standard spaced drives of the entire loop. Since drives are synchronized at all times, these added drives can be used to apply locally higher power to the train. The same factors that control the drives may also be used in operating the train material feeding system. The drive station just prior to a loading station will determine when to command the feeder to start. The drive station just following the loading station will determine when to command the feeder to stop.

By way of example with regard to loading and unloading, prior to loading, the train must decelerate to loading speed. The point at which the train begins deceleration is empirically determined considering drive size and braking capability. The cars have been moving at 10 m/s and must decelerate to 2 m/s by the time the front car of the train reaches the loading station. After loading, the train must accelerate when the final car of the train has been loaded and handed off to the next drive station. The cars move under the loading station at 2 m/s. When loading is complete and the next drive station assumes control, the train will begin an acceleration from 2 m/s to 10 m/s.

With regard to stopping ad braking, and safety reasons, should one drive station require the train to stop, the control system will stop all drive stations until the cause of the stoppage is corrected.

Deceleration rate is determined by the braking capability of the motor drive. Since the system 10 includes communication between drive stations, the next drive station to receive the train will have received the speed of an approaching train and will synchronize to it even during deceleration. Power-off holding braking systems may be incorporated at each drive station. The primary braking functionality is provided by the VFD. Once the train is stopped the holding brake will prevent the train from moving until power is restored.

With regard to adjusting spacing between trains, as the train decelerates into the slower loading and unloading sections of the loop, the distance between trains will become shorter. After loading or unloading, the train accelerates to the operating speed and the distance between the trains will be restored. Acceleration and deceleration rates are dependent on whether the train is loaded or unloaded. These rates, normal running speed, loading speed, unloading speed are used to determine the time it will take for the train to complete one circuit of the course. Knowing this time and the number of trains on the course will determine optimum train spacing time.

Each drive station 30 has the capability of measuring the time between trains and may make minor adjustments to its speed in order to maintain the even spacing of the trains on the course. By way of example, if the time measured is less than the optimum time, the train speed will be decreased slightly. If the time measured is greater than the optimum time, the train speed will be increased slightly. In this manner train spacing is maintained.

The above disclosed embodiments may be operable with systems such as is described in US utility application publication US 2006/0162608 for "Light Rail Transport System for Bulk Materials," the disclosure of which is herein incorporated by reference in its entirety. Further, the disclosures of U.S. Pat. No. 3,752,334 to Robinson et al. for "Industrial Bulk Material Transportation" and of US utility patent application publication US 2003/0226470 to Dibble et al. for "Rail Transport System for Bulk Materials" are also incorporated herein by reference in their entireties.

By way of further example, consider an embodiment of the invention as a control system to include a car and train position sensor, drive station acceleration and speed control, and a train spacing controller as above described, as further described with reference to the logic flow charts of FIGS. 13-17, for which the following Table 1 will be helpful.

TABLE 1

| Acronym | Description |
|---|---|
| DS | Drive Station |
| FOC | Fiber Optic Cable |
| HMI | Human Machine Interface |
| PLC | Programmable Logic Controller |
| SCADA | Supervisory Control and Data Acquisition |
| TP | Train Position |
| TPS | Train Present Sensor |
| TPSF | Train Present Sensor Failure |
| TSF | Train Sensor Failure |
| VFD | Variable Frequency Drive |
| WC | Wheel Count |
| WEC | Wheel Edge Counter |
| WPS | Wheel Present Sensor |
| WPSF | Wheel Present Sensor Failure |

Car/Train Position Sensing

As above described, as a train approaches a drive station, the drive station is commanded to start and accelerate to the appropriate speed prior to the train actually being captured by the tires of the drive station. As a safety feature, failure to sense an approaching train will cause the control to shut the system down. The following will describe a fully redundant, non-contacting sensing system that will minimize the effects of a sensing element failure to the operation.

In one embodiment of the control system, three proximity type sensing devices are located at each drive station. The upper sensor (earlier described as second sensor 38) is located in such a manner that it senses the presence, or absence, of the train's drive plate, as above described. Therefore, the Train Present Sensor (TPS) simply indicates whether or not a train is at the drive station. The small perturbation in the TPS signal due to the gap between the cars will be de-bounced as above described by the PLC's control program.

A sensor pair may be mounted below the sensor as discussed above and be located horizontally in such a manner that it senses the presence, or absence, of each wheel of the train as it passes. Such a wheel present sensor A and wheel present sensor B pair are employed in quadrature detection to count the wheels of a train as the wheels pass the drive station, as illustrated with reference to FIG. 11. The PLC will then calculate the exact location of the train relative to the drive station by simply multiplying the car wheel count times the length of one car.

The WPS pair may also provide information about drive tire slip. The drive station PLC makes comparisons between the commanded drive speed and the actual speed at which the wheels are passing the drive station which is directly proportional the train's velocity. A difference between the two velocities indicates a slippage between the side plate of the train and the drive tire, which is usually eliminated by increasing the pressure of the tire on the side plate using the side plate jacks on each side of the drive station.

As earlier described, a drive at an approaching drive station is accelerated prior to the arrival of a train so that it will be fully accelerated and synchronized to the speed of the train. Since the drive is starting in a no-load condition the only limit as to how fast the acceleration may occur is the torque limit of the VFD.

Assume, for discussion, that the unloaded drive acceleration rate is 2 m/sec$^2$. If a train is approaching a drive station at 10 m/s, then using the equation: Distance=$\frac{1}{2}at^2$, where a=2 m/sec$^2$. The acceleration time (t) is determined by dividing the velocity by the acceleration rate. Therefore, t=(10 m/s/2 m/sec$^2$)=5 sec. Therefore, the distance in front of the drive station which the drive must begin acceleration is: Distance=$\frac{1}{2}at^2=\frac{1}{2}(2)(5)^2=25$ meters.

If the approaching train is at 2 m/s, then the distance in front the drive station which the drive must begin acceleration is much shorter, as shown below: Distance=$\frac{1}{2}at^2$ where a=2 m/sec$^2$ and t=(2 m/s/2 m/sec$^2$)=1 sec. Distance=$\frac{1}{2}(2)(1)^2=1$ meter. The PLC located at each drive station uses these equations to determine when to start the next drive station in line.

Therefore, if the train is moving at 10 m/s, the drive station must start when the train is 25 meters in front of it. If the train is moving at 2 m/s, the drive station must start when it is only 1 meter in front of it. In all cases, as soon as a drive station determines there is no longer a train present, it will quickly decelerate to zero. All of these techniques help to minimize the amount of time the drive station operates, thereby minimizing operating power costs.

As above described, the control system uses train position data at one drive station to tell the next drive station when to start. Using the 10 m/s example, if the drive stations are positioned 400 meters apart with a train 402 meters long, then the control system knows that when 377 meters of train have passed a drive station, it needs to send a command to the following drive to start accelerating. Commands between drive stations are transmitted over a 100 Mb fiber optic Ethernet network.

Should the TPS fail then the control system uses only the WPS for position data, and will send the start command to the drive as it normally does. As soon as the control system senses the first wheel of the train it will assume a train is present until it no longer senses wheels for a period of 3 seconds, at which time the drive station will decelerate to zero. The TPS is determined to have failed when the WPS detects wheels without the TPS sensing the train presence.

Should either of the WPS pair fail, then the control system will immediately send the start command to the next drive station to begin accelerating. As soon as the TPS is lost the drive station will decelerate to zero. The WPS pair is determined to have failed when the TPS senses a train without the WPS pair sensing wheels. In both cases of TPS or WPS failure, the control system's HMI/SCADA will annunciate the failure to the operators and a controlled shutdown of all trains on the course will be made prior to repairing the failed sensor.

Multi-Drive Acceleration Control Scheme

When sizing a drive stations the following are considered: 1) the maximum grade and grade length the train will encounter over the course, 2) the rate at which a fully loaded train needs to be accelerated, and 3) the power required to maintain maximum speed. The maximum grade and grade length are measured during the surveying process. The grade information along with the speed necessary to meet volume/unit time criteria is used calculate the horsepower (kW) required to negotiate the maximum grade of the course.

Early Rail-Veyor™ systems required a train be fully accelerated at one drive station before it entered the next one, because there was no communication between drive stations, one drive station had no idea another drive station's speed. Therefore, it was necessary to have requirement for a train be "up to speed" before it engaged in the next drive station to assure the drive speeds were synchronized. This restriction required larger power motors in order to get the drive station up to speed quickly.

One embodiment of a control system of the present invention uses a 100 Mb Fiber Optic Ethernet network to provide fast and reliable communications between drive stations. As previously described, when a drive station determines that the next drive station should start, it not only transmits the command to begin acceleration, it also transmits the target speed for the acceleration. This ensures that the two drives are synchronized which is necessary for smooth transition from one drive station to the next, and does not mean that the drive be fully up to running speed.

The ability to accelerate to full running speed over multiple drive stations means smaller motors and subsequently lower cost gear reducers and VFD's. The power requirements of a drive motor and acceleration time are inversely proportional (doubling the acceleration time requires half of the horsepower.) Practically speaking, the size and number of the drive stations is dependent on the maximum grade and grade length the system will encounter. By way of example, if it is determined that a train will encounter a maximum of 5% grade and the cars are accelerated to full speed of 10 m/s from a dead stop in three minutes, then drive station power requirements will be approximately 640 horsepower. If the same train under the same conditions is accelerated from a dead stop to full speed in eight minutes the drive station drive requirement would drop to approximately 310 horsepower. Significant savings in capital and operating costs are possible by extending the length of acceleration time. If desirable, simply adding more drive stations will increase acceleration times, thereby decreasing cycle time.

Train Spacing Control Algorithm

When multiple trains are used on a single course, it is necessary to insure they are appropriately spaced. The network communications scheme described above allows the system to know the position of each train on the course to an accuracy of one car length. A typical system might have trains spaced every 1-5 km. The master control system's PLC keeps a table of the positions of all trains on the course. The process of spacing the trains begins at the exit of the loading area which typically requires the trains to move at slower speed (for example 2m/s.) A train is released from the loading station to accelerate to full speed (in this example we'll use 10 m/s) when it identifies a clear track distance ahead. This distance is determined by calculating the time for one train to make one complete circuit of the course. This time is then divided by the number of trains that will be operating on the course.

By way of further example, consider a control system operable with a Rail-Veyor™ having the following characteristics: Total course length=250 km; Total number of trains operating=50 trains; Time required to accelerate & decelerate=8 minutes; Overland speed=10 m/s; Load/Unload speed=2 m/s; and Load/Unload distance=2 km.

The time for a train to complete one circuit of the course is 7:36:08. Therefore, if 50 trains are operating at the time spacing between trains is 9:07. The distance a full speed train will travel in that time at 10 m/s is 5470 meters. The amount of clear track ahead is calculated by subtracting the distance needed for acceleration from 5470 meters. Using 8 minutes for the acceleration time, this distance is 2880 meters. Therefore, in this example, the clear track distance is calculated to be 5470−2880=2590 meters. When there is 2590 meters of clear track, the train is released to accelerate from the loading station. Once the train is fully accelerated, the train spacing will be 5470 meters.

The same method may be used before a train is released from the unload area. In addition to these controls, during the full speed sections of the course, the position of a next train is constantly checked by the master control system's PLC and small adjustments to the train's speed are made to correct to the proper distance.

Many modifications and other embodiments of the invention will come to the mind of one skilled in the art having the benefit of the teachings presented in the foregoing description. Therefore, it is understood that the invention is not to be limited to the specific embodiments disclosed, and that modifications and embodiments are intended to be within the scope of claims supported by this disclosure.

That which is claimed is:

1. A method of controlling movement of a train along a track, wherein the train is driven by a plurality of drive stations positioned along the track, and wherein the train includes a lead car and a rear car, each car having wheels for rolling along the track and each car having a side plate thereon, each of the plurality of drive stations having a drive tire positioned for making frictional contact with the side plates at preselected intervals along the track for moving the train along the track, the method comprising:

providing first and second sensors at each of the plurality of drive stations;

positioning the first sensor for sensing a position of each car rolling along the track at the drive station;

positioning the second sensor for sensing a presence of the side plate;

operating a first drive station of the plurality of drive stations for moving the train along the track at a preselected speed;

sensing at least one of the lead car and the rear car;

the first drive station initially accelerating the train at a first acceleration rate of the drive tire to a target speed for the train and driving the train at the target speed toward a second drive station of the plurality of drive stations;

sensing each car as each car of the train passes the first sensor for determining a position of the train relative to the first drive station;

sensing a leading edge of a first side plate carried by the lead car, wherein the leading edge sensing provides a signal confirming the train is present;

transmitting a fast acceleration command signal to the second drive station when the lead car is within a preselected distance from the second drive station, wherein a start signal is initiated based on a train length and a presence thereof resulting from signals from the first and second sensors;

accelerating the drive tire at the second drive station to the target speed at a second acceleration rate responsive to the fast acceleration command signal, the second acceleration rate greater than the first acceleration rate, for synchronizing the first drive station with the second drive station;

receiving the train at the second drive station for continuing to drive the train;

sensing each car of the train as each car passes the first sensor at the second drive station for determining a position of the train relative to the second drive station;

sensing the leading edge of the first side plate by the second sensor at the second drive station for confirming a presence of the train; and transmitting a stop command to the first drive station for fast decelerating the drive tire of the first drive station to a stop, wherein a deceleration rate for the drive tire decelerating is proximate an absolute value of the second acceleration rate.

2. The method according to claim 1, wherein the target speed comprises one of a load speed, a travel speed, and an unload speed.

3. The method according to claim 1, wherein the movement of the train comprises the train driven by the drive stations at:

a first speed at which the train is loaded;

an acceleration to a second speed for movement of the loaded train downstream for unloading;

a deceleration of the loaded train to a third speed for an unloading thereof;

an acceleration of the unloaded train to the second speed; and a deceleration of the train to the first speed for again loading the train.

4. The method according to claim 1, wherein sensing each car comprises sensing wheels within the train and providing a wheel count, and wherein the wheel count is used in determining the train position.

5. The method according to claim 1, wherein a gap exists between a trailing edge of a first side plate on one car and a leading edge of a second side plate on an adjacent car, and wherein the gap produces a disruption in a sensing signal provided by the second sensor, the method further comprising the second sensor correcting from the disruption using a debounce circuit for determining that the second side plate is present.

6. The method according to claim 4, wherein a first wheel carried by the lead car is forward a leading edge of the side plate carried by the lead car, thus the sensing of the first wheel by the drive stations occurs before the sensing of the leading edge of the side plate.

7. The method according to claim 1, wherein each of the plurality of drive stations communicates with the first and second sensors for transmitting sensor data to adjacent drive stations, and wherein each drive station is responsive for controlling the speed of the drive tire.

8. The method according to claim 1, wherein the first and second sensors for each of the plurality of drive stations communicates with a central controller, and wherein the central controller monitors operations for each of the drive stations by providing at least one of drive tire speed, train location along the track, and speed of the train.

9. A method of controlling movement of a train along a track, wherein the train is driven by a plurality of drive stations positioned along the track, and wherein the train includes a lead car and a rear car, each car having wheels for rolling along the track and each car having a side plate thereon, each of the plurality of drive stations having a drive tire positioned for making frictional contact with the side plates at preselected intervals along the track for moving the train along the track, the method comprising:

providing first and second sensors at each of the plurality of drive stations;

sensing a position of each car by the first sensor, wherein each car is rolling along the track at the drive station;

sensing a presence of the side plate by the second sensor;

operating a first drive station of the plurality of drive stations, the first drive station moving the train along the track at a preselected speed, wherein the first drive station initially accelerates the train at a first acceleration rate of the drive tire to a target speed for the train and drives the train at the target speed toward a second drive station of the plurality of drive stations;

sensing each car as each car of the train passes the first sensor and determining a position of the train relative to the first drive station;

sensing a leading edge of a first side plate carried by the lead car, wherein the leading edge sensing provides a signal confirming the train is present;

transmitting a fast acceleration command signal to the second drive station when the lead car is within a preselected distance from the second drive station, wherein a start signal to the second drive station is initiated based on a train length and a presence thereof resulting from signals from the first and second sensors;

accelerating the drive tire at the second drive station to the target speed at a second acceleration rate responsive to the fast acceleration command signal, the second acceleration rate greater than the first acceleration rate, and synchronizing the first drive station with the second drive station;

receiving the train at the second drive station; and continuing to drive the train.

10. The method according to claim 9, further comprising:

sensing each car of the train as each car passes the first sensor at the second drive station and determining a position of the train relative to the second drive station;

sensing the leading edge of the first side plate by the second sensor at the second drive station and confirming a presence of the train; and transmitting a stop command to the first drive station and decelerating the drive tire of the first drive station to a stop, wherein a deceleration rate for the drive tire decelerating is proximate an absolute value of the second acceleration rate.

11. The method according to claim 10, wherein a gap exists between a trailing edge of a first side plate on one car and a leading edge of a second side plate on an adjacent car, and wherein the gap produces a disruption in a sensing signal provided by the second sensor, the method further comprising the second sensor correcting from the disruption using a debounce circuit and determining that the second side plate is present.

12. The method according to claim 9, wherein the target speed comprises at least one of a load speed, a travel speed, and an unload speed.

13. The method according to claim 9, wherein the movement of the train comprises the train driven by the drive stations at:

a first speed at which the train is loaded;

accelerating to a second speed and moving the loaded train downstream to an unloading location;

decelerating of the loaded train to a third speed and unloading the loaded train;

accelerating of the unloaded train to the second speed; and decelerating of the train to the first speed and again loading the train.

14. The method according to claim 9, wherein sensing each car comprises sensing wheels within the train and providing a wheel count, and wherein the wheel count is used in determining the train position.

15. The method according to claim 14, wherein a first wheel carried by the lead car is forward a leading edge of the side plate carried by the lead car, thus the sensing of the first wheel by the drive stations occurs before the sensing of the leading edge of the side plate.

16. The method according to claim 9, wherein each of the plurality of drive stations communicates with the first and second sensors and transmits transmitting sensor data to adjacent drive stations, and wherein each drive station controls the speed of the drive tire.

17. The method according to claim 9, wherein the first and second sensors for each of the plurality of drive stations communicate with a central controller, and wherein the central controller monitors operations for each of the drive stations by providing at least one of drive tire speed, train location along the track, and speed of the train.

* * * * *